(12) United States Patent
Seol et al.

(10) Patent No.: US 10,901,574 B2
(45) Date of Patent: Jan. 26, 2021

(54) MOBILE TERMINAL AND METHOD FOR MULTI-TASKING USING AN EXTENDED REGION TO DISPLAY RELATED CONTENT

(71) Applicant: LG ELECTRONICS INC., Seoul (KR)

(72) Inventors: Jie Seol, Seoul (KR); Joowoo Lee, Seoul (KR); Soomin Kim, Seoul (KR); Minsoo Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 145 days.

(21) Appl. No.: 15/416,659

(22) Filed: Jan. 26, 2017

(65) Prior Publication Data
US 2018/0052571 A1  Feb. 22, 2018

(30) Foreign Application Priority Data

Aug. 16, 2016 (KR) .................. 10-2016-0103695

(51) Int. Cl.
*G06F 3/0482* (2013.01)
*G06F 3/0481* (2013.01)
*G06F 3/01* (2006.01)
*H04N 5/232* (2006.01)
*G06F 3/0484* (2013.01)
(Continued)

(52) U.S. Cl.
CPC ............ *G06F 3/0482* (2013.01); *G06F 3/016* (2013.01); *G06F 3/0481* (2013.01); *G06F 3/0486* (2013.01); *G06F 3/0488* (2013.01); *G06F 3/04817* (2013.01); *G06F 3/04845* (2013.01); *H04N 5/23216* (2013.01);
(Continued)

(58) Field of Classification Search
CPC .. G06F 3/04817; G06F 3/0482; G06F 3/0486; G06F 3/04886; G06F 2203/04803; H04N 5/232939
See application file for complete search history.

(56) References Cited

U.S. PATENT DOCUMENTS 10,254,915 B2 *  4/2019  Choi ................... G06F 3/04817
10,282,088 B2 *  5/2019  Kim .................... G06F 3/04886
(Continued)

OTHER PUBLICATIONS

PCT International Application No. PCT/KR2017/002754, Notification of Transmittal of the International Search Report and the Written Opinion of the International Searching Authority, or Declaration dated Jul. 13, 2017, 13 pages.

*Primary Examiner* — Alvin H Tan
(74) *Attorney, Agent, or Firm* — Lee, Hong, Degerman, Kang & Waimey

(57) ABSTRACT

A mobile terminal according to the present disclosure may include a first region disposed on a front surface of a body and a second region extended and formed in at least one direction of the first region, and include a display unit configured to display an execution screen of a first application in the first region, and display icons corresponding to at least one application, respectively, that are preset in association with the first application in the second region, and a controller configured to display an execution screen of a second application corresponding to a selected icon in one region of the first region, and display at least one control icon for controlling the execution of the second application in the second region, based on the application of a user input for selecting one of the icons.

9 Claims, 27 Drawing Sheets

(51) Int. Cl.
*G06F 3/0486* (2013.01)
*G06F 3/0488* (2013.01)

(52) U.S. Cl.
CPC ... *H04N 5/23293* (2013.01); *H04N 5/232939* (2018.08); *G06F 2203/04803* (2013.01)

(56) References Cited

U.S. PATENT DOCUMENTS

| | | |
|---|---|---|
| 2011/0080356 A1 | 4/2011 | Kang et al. |
| 2014/0053097 A1 | 2/2014 | Shin et al. |
| 2014/0137018 A1* | 5/2014 | Eichberger .............. G06F 17/21 715/769 |
| 2014/0223372 A1* | 8/2014 | Dostie ................... G06F 3/0482 715/813 |
| 2014/0229888 A1 | 8/2014 | Ko et al. |
| 2015/0227308 A1 | 8/2015 | Kim et al. |
| 2016/0124595 A1 | 5/2016 | Kim et al. |
| 2017/0083524 A1* | 3/2017 | Huang ................... G06N 7/005 |
| 2017/0102870 A1* | 4/2017 | Won ....................... G06F 3/0481 |

\* cited by examiner

FIG. 20
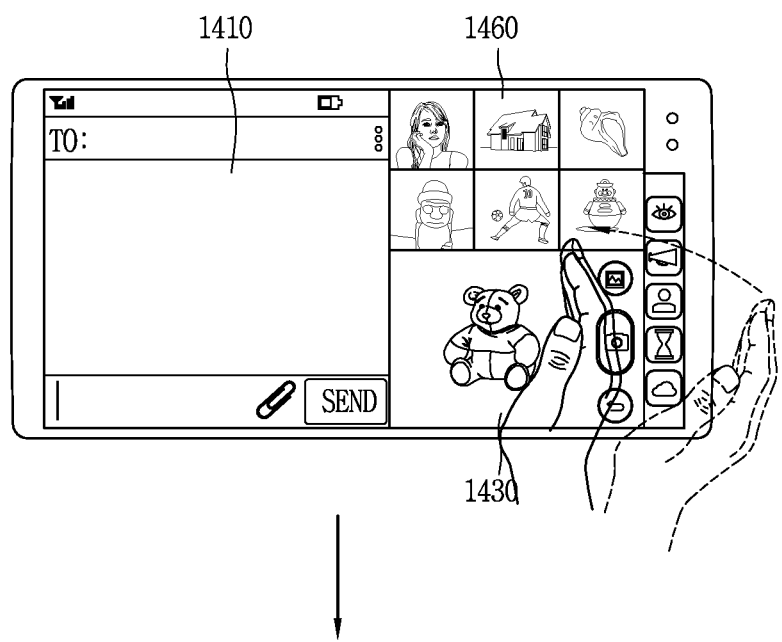
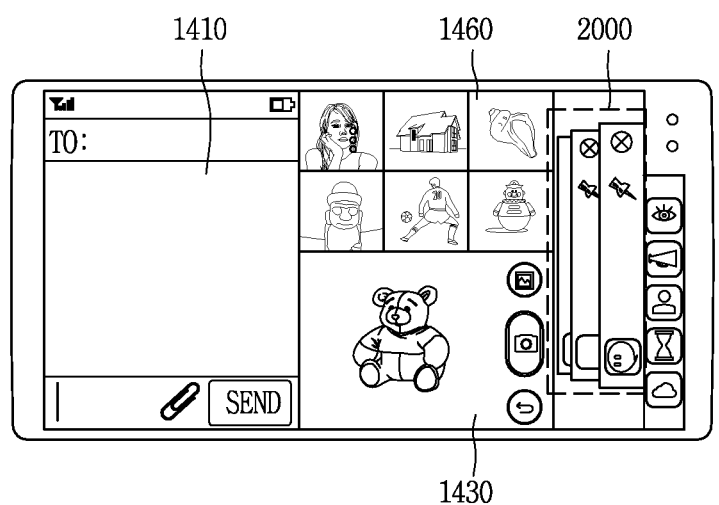

MOBILE TERMINAL AND METHOD FOR MULTI-TASKING USING AN EXTENDED REGION TO DISPLAY RELATED CONTENT

CROSS-REFERENCE TO RELATED APPLICATION

Pursuant to 35 U.S.C. § 119(a), this application claims the benefit of earlier filing date and right of priority to Korean Patent Application No. 10-2016-0103695, filed on Aug. 16, 2016, which is hereby incorporated by reference herein in its entirety.

BACKGROUND OF THE INVENTION

1. Field of the Invention

The present disclosure relates to a mobile terminal including a display unit consisting of a plurality of regions, and a control method thereof.

2. Description of the Related Art

Terminals may be generally classified into mobile/portable terminals or stationary terminals according to their mobility. Mobile terminals may also be classified as hand-held terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

Accordingly, the need of multi-tasking of a plurality of applications has been increased. As a result, when content on an application is desired to be used on another application being executed, there exists the inconvenience of repeating the execution and termination of the applications.

SUMMARY OF THE INVENTION

An object of the present disclosure is to solve the foregoing problems and other problems. Another object of the present disclosure is to provide a mobile terminal capable of displaying an icon of an application including attachable contents in an extended region to perform multi-tasking such as file attachments or the like when a content attachable application is executed in a main region, and a control method thereof.

In order to accomplish the above and other objectives, according to an aspect of the present disclosure, there is provided a mobile terminal including a first region disposed on a front surface of a body and a second region extended and formed in at least one direction of the first region, and the mobile terminal may include a display unit configured to display an execution screen of a first application in the first region, and display icons corresponding to at least one application, respectively, that are preset in association with the first application in the second region; and a controller configured to display an execution screen of a second application corresponding to a selected icon in one region of the first region, and display at least one control icon for controlling the execution of the second application in the second region, based on the application of a user input for selecting one of the icons.

According to an embodiment, the controller may execute a control operation corresponding to the selected icon based on the application of a user input for selecting one of the control icons According to another embodiment, the controller may control the execution of the first application based on a preset user input applied to the execution screen of the second application.

According to still another embodiment, the controller may display icons corresponding to at least one application, respectively, including contents that are attachable to the first application in the second region based on the execution screen of the first application to which content is attachable, being displayed in the first region.

According to yet still another embodiment, the controller may display the execution screen of the second application corresponding to the selected icon in one region of the first region based on the application of a user input for selecting one of the icons, and control the execution of the first application to attach the selected content based on the application of a user input for selecting at least one content to the execution screen of the second application.

According to still yet another embodiment, the controller may display an execution screen of a camera application in one region of the first region based on a preset user input applied to an icon of a camera application among the icons.

According to yet still another embodiment, the controller may control the execution of the first application to attach a selected image based on the application of a user input for selecting at least one image to the execution screen of the camera application.

According to still yet another embodiment, the controller may display at least one control icon for image editing in the second region based on the execution screen of the camera application being displayed in one region of the first region.

According to yet still another embodiment, the controller may display at least one control icon for capture value setting in the second region based on the execution screen of the camera application being displayed in one region of the first region.

According to still yet another embodiment, the controller may control the execution of the first application to capture an image and attach the captured image based on the application of a user input for image capture to the execution screen of the camera application.

According to yet still another embodiment, the controller may display an execution screen of an internet application in one region of the first region based on a preset user input applied to an icon of the internet application among the icons.

According to still yet another embodiment, the controller may control the execution of the first application to attach a selected content based on the application of a user input for selecting at least one content to the execution screen of the internet application.

According to yet still another embodiment, the controller may display a control icon for internet page switching in the second region based on the execution screen of the internet application being displayed in one region of the first region.

According to still yet another embodiment, the controller may switch the execution screens of the first application and the second application, and the display directions of the control icons based on the application of a preset user input.

According to yet still another embodiment, the controller may consecutively capture a plurality of images and display the captured plurality of images in one region of the first region based on a preset user input applied to an icon of a camera application among the icons, and control the execution screen of the camera application to attach a selected image based on the application of a user input for selecting at least one image of the plurality of images.

Furthermore, according to another aspect of the present disclosure, there is provided a control method of a mobile terminal, and the method may include (a) displaying an execution screen of a first application in a first region of a display unit disposed on a front surface of a body, and displaying icons corresponding to at least one application, respectively, that are preset in association with the first application in a second region of the display unit extended and formed in at least one direction of the first region; and (b) displaying an execution screen of a second application corresponding to a selected icon in one region of the first region, and displaying at least one control icon for controlling the execution of the second application in the second region, based on the application of a user input for selecting one of the icons.

According to an embodiment, said step (b) may include executing a control operation corresponding to the selected icon based on the application of a user input for selecting one of the control icons According to another embodiment, said step (b) may include controlling the execution of the first application based on a preset user input applied to the execution screen of the second application.

According to still another embodiment, said step (a) may include displaying icons corresponding to at least one application, respectively, including contents that are attachable to the first application in the second region based on the execution screen of the first application to which content is attachable, being displayed in the first region.

According to yet still another embodiment, said step (b) may include displaying the execution screen of the second application corresponding to the selected icon in one region of the first region based on the application of a user input for selecting one of the icons, and controlling the execution of the first application to attach the selected content based on the application of a user input for selecting at least one content to the execution screen of the second application.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 20 is a conceptual view for explaining an embodiment in which a recently used application is shown by a user input;

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1A:
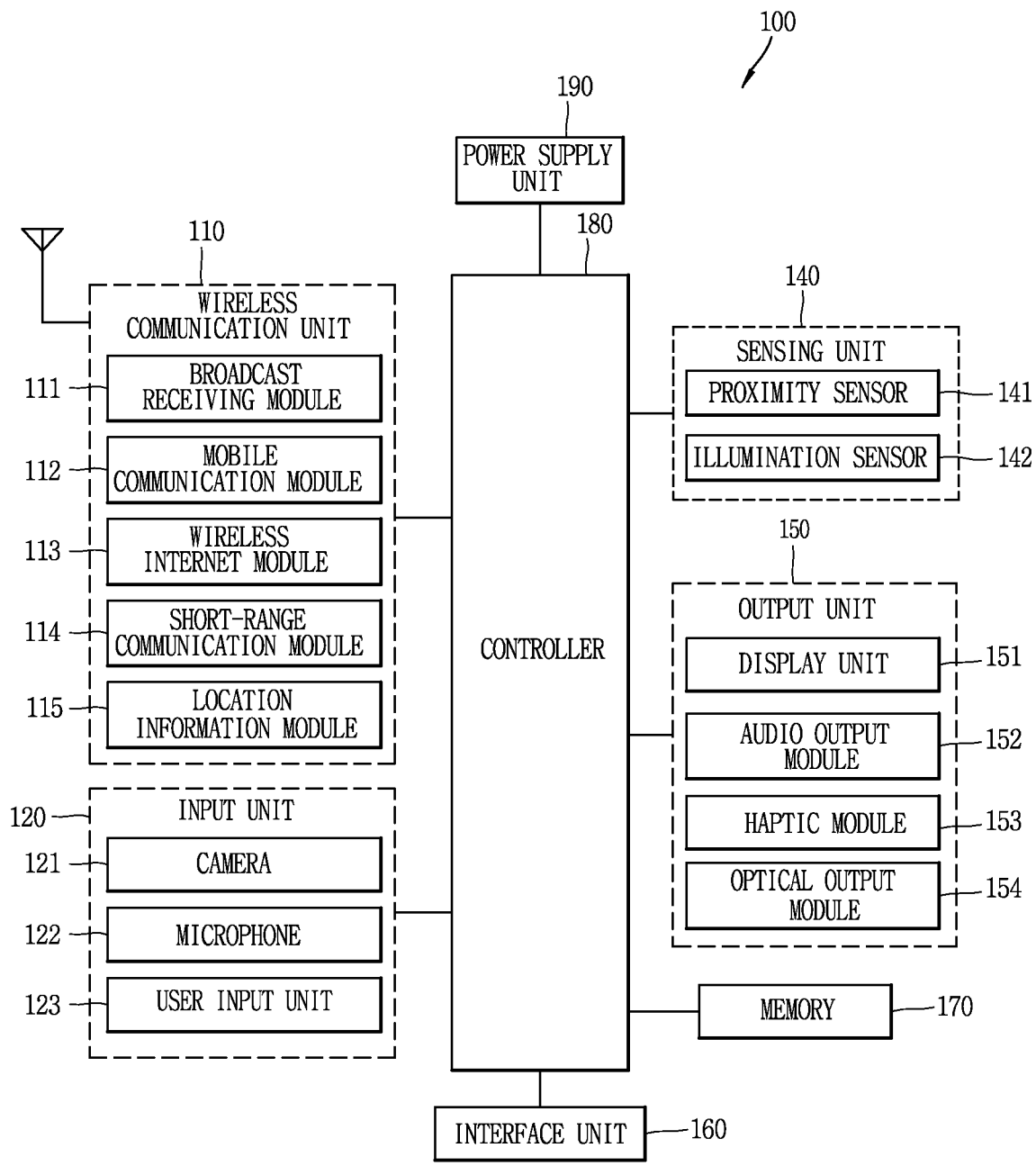
FIG. 1A is a block diagram for explaining a mobile terminal associated with the present disclosure.
Figure 1B:
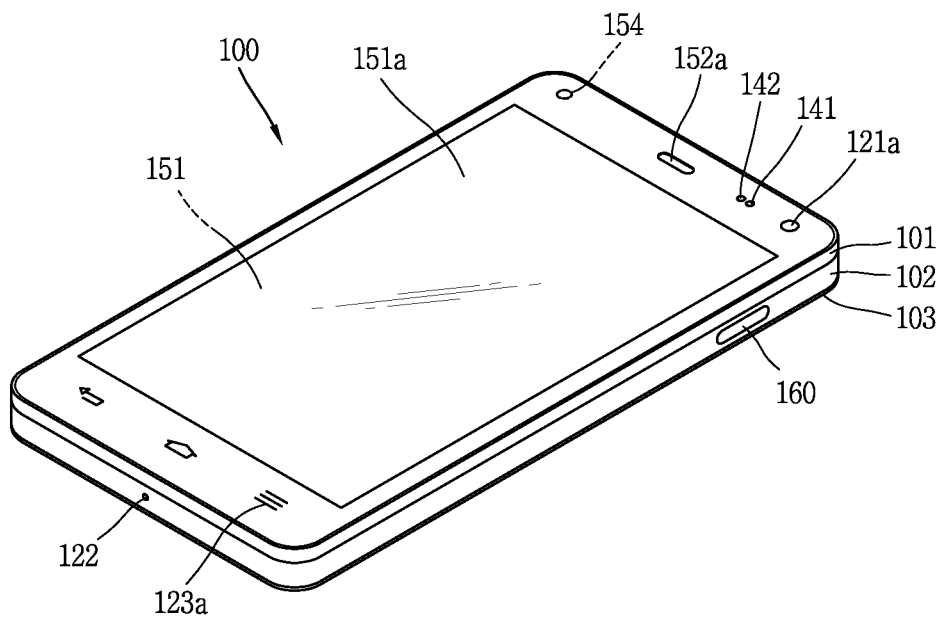
FIGS. 1B and 1C are conceptual views illustrating an example in which a mobile terminal associated with the present disclosure is seen from different directions.
Figure 1C:
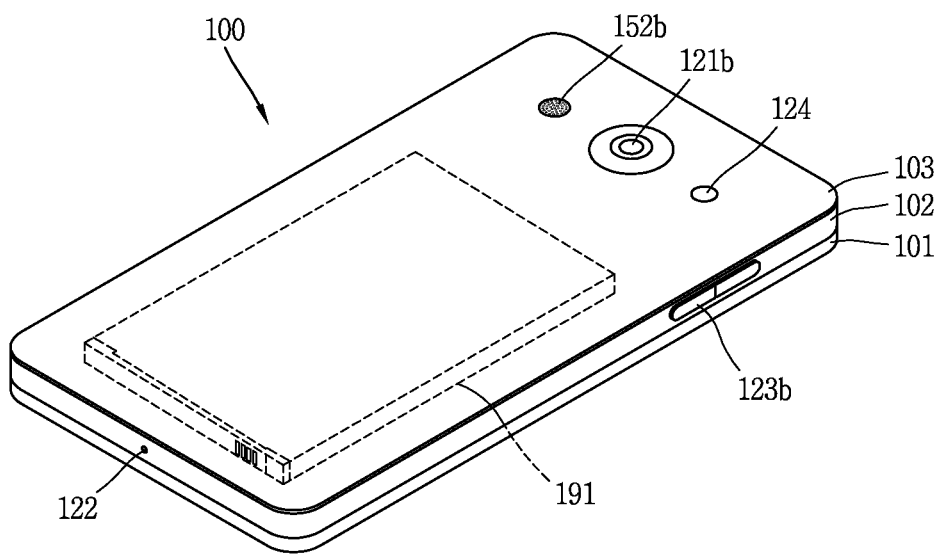

Referring to FIGS. 1A through 1C, FIG. 1A is a block diagram of a mobile terminal in accordance with the present disclosure, FIGS. 1B and 1C are conceptual views of one example of the mobile terminal, viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

The wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), etc.)

Here, the wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless-Fidelity (Wi-Fi), Wireless Fidelity Direct (Wi-Fi Direct), Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), LTE (Long Term Evolution), LTE-A (Long Term Evolution-Advanced), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB) and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glass or a head mounted display (HMD), which is able to exchange data with the mobile terminal 100 (or to cooperate with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. According to the need, the location information module 115 may perform any function of the other modules of the wireless communication unit 110 to obtain data on the location of the mobile terminal. As a module used to acquire the location (or current location) of the mobile terminal, the location information module 115 may not be necessarily limited to a module for directly calculating or acquiring the location of the mobile terminal.

Hereinafter, the input unit 120 will be described in more detail. The input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swype touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor (or image sensor) and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images.

The stereoscopic display unit 152 may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a status of the mobile terminal meets a preset condition.

The controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description to be associated with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

Here, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not shown) on a rear surface of the window 151a or patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating to an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 (refer to FIG. 1A) for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Figure 2:
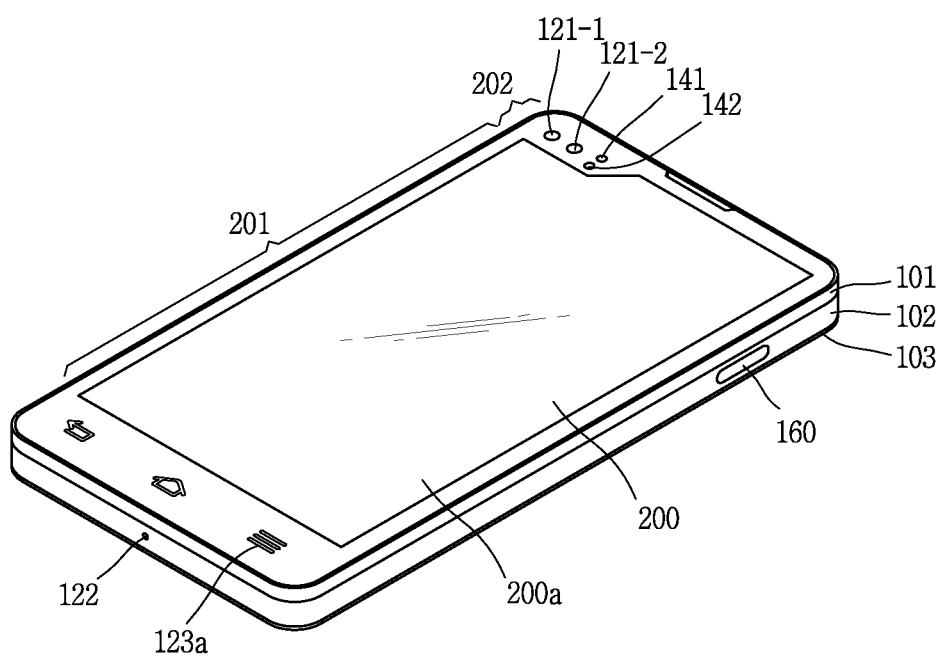
FIG. 2 is a conceptual view in which a mobile terminal applied to the present disclosure is seen from a front side.

FIG. 2 is a conceptual view in which a mobile terminal applied to the present disclosure is seen from a front side.

As illustrated in FIG. 2, a mobile terminal according to the present disclosure may include at least one or more display regions independently activated from one another within one display unit (or display panel) 200. The display unit 200 has a different structure from the display unit 151 on which the entire region is activated/deactivated at the same time in the aspect of independently activating/deactivating a partial region.

In other words, the display unit 200 according to the present disclosure has a structure in which one side of the display unit 151 illustrated in FIG. 1B is extended in a predetermined direction, for example, an upward direction. For the sake of convenience of explanation, only an example in which one side thereof is extended in an upward direction has been disclosed in FIG. 2, but the present disclosure may not be necessarily limited to this, and extended in the left, right, lateral or downward direction.

On the display unit 200, a first region 201 as a main region corresponds to the display unit 151 in FIG. 1B, and a second region 202 corresponds to an extended region. The two regions 201, 202 may be independently controlled by the controller 180. The extended region 202 has a different shape and size from that of the main region 201.

Accordingly, the present disclosure may selectively activate one of the two regions 201, 202 according to the need to reduce power consumption.

General image information may be displayed in the main region 201, and an event occurrence or status bar may be displayed in the extended region 202, and additional information may be displayed according to the type of an application displayed in the main region 201. In particular, when the main region 201 is in an inactive state (off state), status information may be displayed in the extended region, and when the main region 201 becomes an active state (on state), the status information is displayed at an upper portion of the main region.

Accordingly, when it is controlled such that the main region 201 is deactivated, and the extended region 202 is activated in a state that a user does not use a terminal, the user may check the status of the mobile terminal or a newly occurred event.

The extended region 202 may be formed to be smaller than or the same as a horizontal or vertical length of the main region 201 as illustrated in the drawing. According to the present disclosure, a case where a horizontal length of the extended region 202 is smaller than that of the main region 201.

In this case, the camera 121a, proximity sensor 141, and illumination sensor 142 that have been located at an upper bezel of the display unit 151 in FIG. 1B may be disposed at the left side of the extended region 202 as illustrated in FIG. 2.

When a horizontal length of the extended region 202 is formed to be smaller than that of the main region 201, at least one side may be formed as one of a straight line, an inclined surface and a curved surface.

Figure 3:
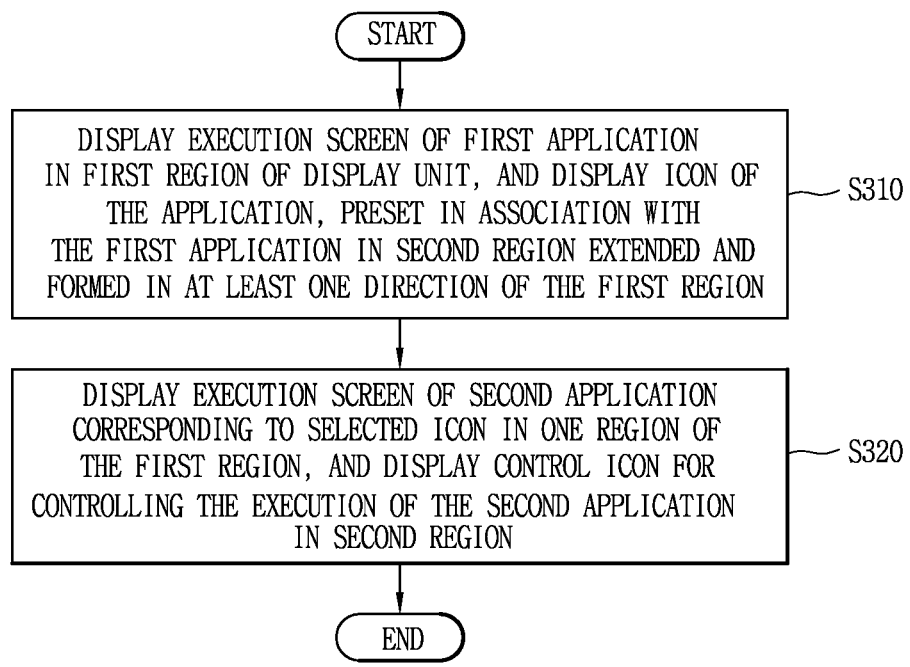
FIG. 3 is a flow chart for explaining a control method of a mobile terminal according to the present disclosure.

FIG. 3 is a flow chart for explaining a control method of a mobile terminal according to the present disclosure.

Referring to FIG. 3, first, the process (S310) of displaying an execution screen of a first application in the first region 201 of the display unit disposed on a front surface of the body, and displaying icons corresponding to at least one application, respectively, that are preset in association with the first application in the second region 202 of the display unit extended and formed in at least one direction of the first region 201 is carried out.

Subsequently, the process (S320) of displaying an execution screen of a second application corresponding to a selected icon in one region of the first region 201, and displaying at least one control icon for controlling the execution of the second application in the second region 202, based on the application of a user input for selecting one of the icons is carried out.

According to an embodiment, the process S320 may include executing a control operation corresponding to the selected icon based on the application of a user input for selecting one of the control icons According to another embodiment, the process 320 may include controlling the execution of the first application based on a preset user input applied to the execution screen of the second application.

According to still another embodiment, the process 310 may include displaying icons corresponding to at least one application, respectively, including contents that are attachable to the first application in the second region 202 based on the execution screen of the first application to which content is attachable, being displayed in the first region 201.

According to yet still another embodiment, the process S320 may include displaying the execution screen of the second application corresponding to the selected icon in one region of the first region 201 based on the application of a user input for selecting one of the icons, and controlling the execution of the first application to attach the selected content based on the application of a user input for selecting at least one content to the execution screen of the second application.

Hereinafter, a specific embodiment will be described in the aspect of the constituent elements.

In order to accomplish the above and other objectives, according to an aspect of the present disclosure, the display unit 200 may include the first region 201 disposed on a front surface of a body and the second region 202 extended and formed in at least one direction of the first region 201, and display an execution screen of a first application in the first region 201, and display icons corresponding to at least one application, respectively, that are preset in association with the first application in the second region 202.

The controller 180 may display an execution screen of a second application corresponding to a selected icon in one region of the first region 201, and display at least one control icon for controlling the execution of the second application in the second region 202, based on the application of a user input for selecting one of the icons.

According to an embodiment, the controller 180 may execute a control operation corresponding to the selected icon based on the application of a user input for selecting one of the control icons According to another embodiment, the controller 180 may control the execution of the first application based on a preset user input applied to the execution screen of the second application.

According to still another embodiment, the controller 180 may display icons corresponding to at least one application, respectively, including contents that are attachable to the first application in the second region 202 based on the execution screen of the first application to which content is attachable, being displayed in the first region 201.

According to yet still another embodiment, the controller 180 may display the execution screen of the second application corresponding to the selected icon in one region of the first region 201 based on the application of a user input for selecting one of the icons, and control the execution of the first application to attach the selected content based on the application of a user input for selecting at least one content to the execution screen of the second application.

According to still yet another embodiment, the controller 180 may display an execution screen of a camera application in one region of the first region 201 based on a preset user input applied to an icon of a camera application among the icons.

According to yet still another embodiment, the controller 180 may control the execution of the first application to attach a selected image based on the application of a user input for selecting at least one image to the execution screen of the camera application.

According to still yet another embodiment, the controller 180 may display at least one control icon for image editing in the second region 202 based on the execution screen of the camera application being displayed in one region of the first region 201.

According to yet still another embodiment, the controller 180 may display at least one control icon for capture value setting in the second region 202 based on the execution screen of the camera application being displayed in one region of the first region 201.

According to still yet another embodiment, the controller 180 may control the execution of the first application to capture an image and attach the captured image based on the application of a user input for image capture to the execution screen of the camera application.

According to yet still another embodiment, the controller 180 may display an execution screen of an internet application in one region of the first region 201 based on a preset user input applied to an icon of the internet application among the icons.

According to still yet another embodiment, the controller 180 may control the execution of the first application to attach a selected content based on the application of a user input for selecting at least one content to the execution screen of the internet application.

According to yet still another embodiment, the controller 180 may display a control icon for internet page switching in the second region 202 based on the execution screen of the internet application being displayed in one region of the first region 201.

According to still yet another embodiment, the controller 180 may switch the execution screens of the first application and the second application, and the display directions of the control icons based on the application of a preset user input.

According to yet still another embodiment, the controller 180 may consecutively capture a plurality of images and display the captured plurality of images in one region of the first region 201 based on a preset user input applied to an icon of a camera application among the icons, and control the execution screen of the camera application to attach a selected image based on the application of a user input for selecting at least one image of the plurality of images.

On the other hand, the controller 180 may display the execution screen of the camera application in one region of the first region 201 based on a preset user interface applied to an icon of a camera application among the icons.

Figure 4:
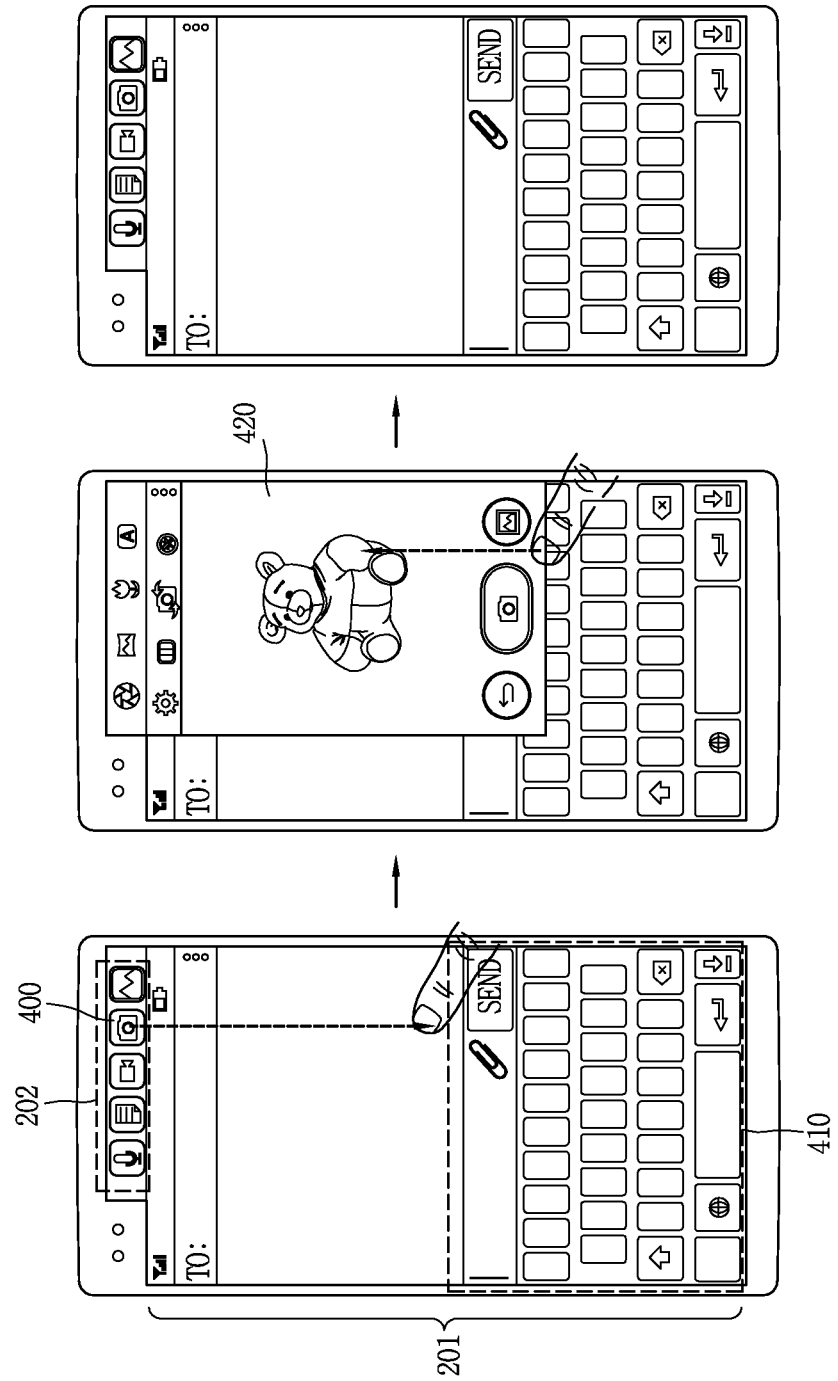
FIG. 4 is a conceptual view for explaining an embodiment in which when a messenger application is executed in a main region, the icons of applications including attachable contents are displayed in an extended region, and a camera application among them is selected and then executed.

FIG. 4 is a conceptual view for explaining an embodiment in which when a messenger application is executed in a main region, the icons of applications including attachable contents are displayed in an extended region, and a camera application among them is selected and then executed.

Referring to FIG. 4, an execution screen of an application to which content is attachable may be displayed in the main region 201 of the display unit 200.

For an embodiment, due to the execution of mail, text message, SNS, memo, schedule management, messenger application or the like, a keyboard screen 410 for attaching text writing and file (content) attachment may be displayed in the main region 201 of the keyboard screen 410.

Furthermore, the icons of applications including attachable contents may be displayed in the extended region 202 of the display unit 200. For example, the icons of a camera, a photo album, an internet, a memo application, and the like may be displayed. Specifically, an icon of an application including content attachable to an application being executed in the main region 201 may be displayed in the extended region 202.

Subsequently, when a user input (swype down) for sliding downward subsequent to touching an icon 400 of the camera application is applied, an execution screen 420 of the camera application may be displayed in the main region 201.

For an embodiment, the execution screen 420 of the camera application may be displayed with a floating window on an execution screen of a messenger application being displayed in the main region 201. Here, the execution screen 420 of the camera application may be displayed in the vicinity to be linked to the extended region 202.

Icons for executing specific functions of the camera application may be displayed in the extended region 202. Here, the icons for executing specific functions may be displayed in consideration of a currently displayed content (preview image, captured image, etc.), a current process (whether it is prior to capture or immediately subsequent to capture, etc.), and the like.

Specifically, when a preview image 500 is being displayed in the main region 201, a lens setting icon, a capture image effect (filter) setting icon, a capture technique (panorama, auto, pop out, etc.), and the like may be displayed.

For another embodiment, icons for capture value setting may be displayed in different ways in the extended region 202 according to whether the camera is a front or rear camera.

For still another embodiment, additional icons (flash, front/rear camera switching, environment setting, mode setting, etc.) for capture value setting may be displayed at an upper end of the execution screen 420 of the camera application adjacent to the extended region 202.

For yet still another embodiment, when a drag input is applied in the left or right direction to the extended region 202, the additional icons may be displayed in a manner of turning over a list.

Then, when a user input (swype up) for sliding upward is applied to the execution screen 420 of the camera application, the execution screen 420 of the camera application may disappear and return to an initial state. In other words, the execution of the camera application may be ended.

Furthermore, the icons of applications that have been previously displayed, namely, the icons of application including attachable contents may be displayed again in the extended region 202.

On the other hand, the controller 180 may control the execution of the first application to attach a selected image based on the application of a user input for selecting at least one image to the execution screen of the camera application.

For another embodiment, the controller 180 may display at least one control icon for image editing in the second region 202 based on the execution screen of the camera application being displayed in one region of the first region 201.

For still another embodiment, the controller 180 may display at least one control icon for capture value setting in the second region 202 based on the execution screen of the camera application being displayed in one region of the first region 201.

Figure 5:
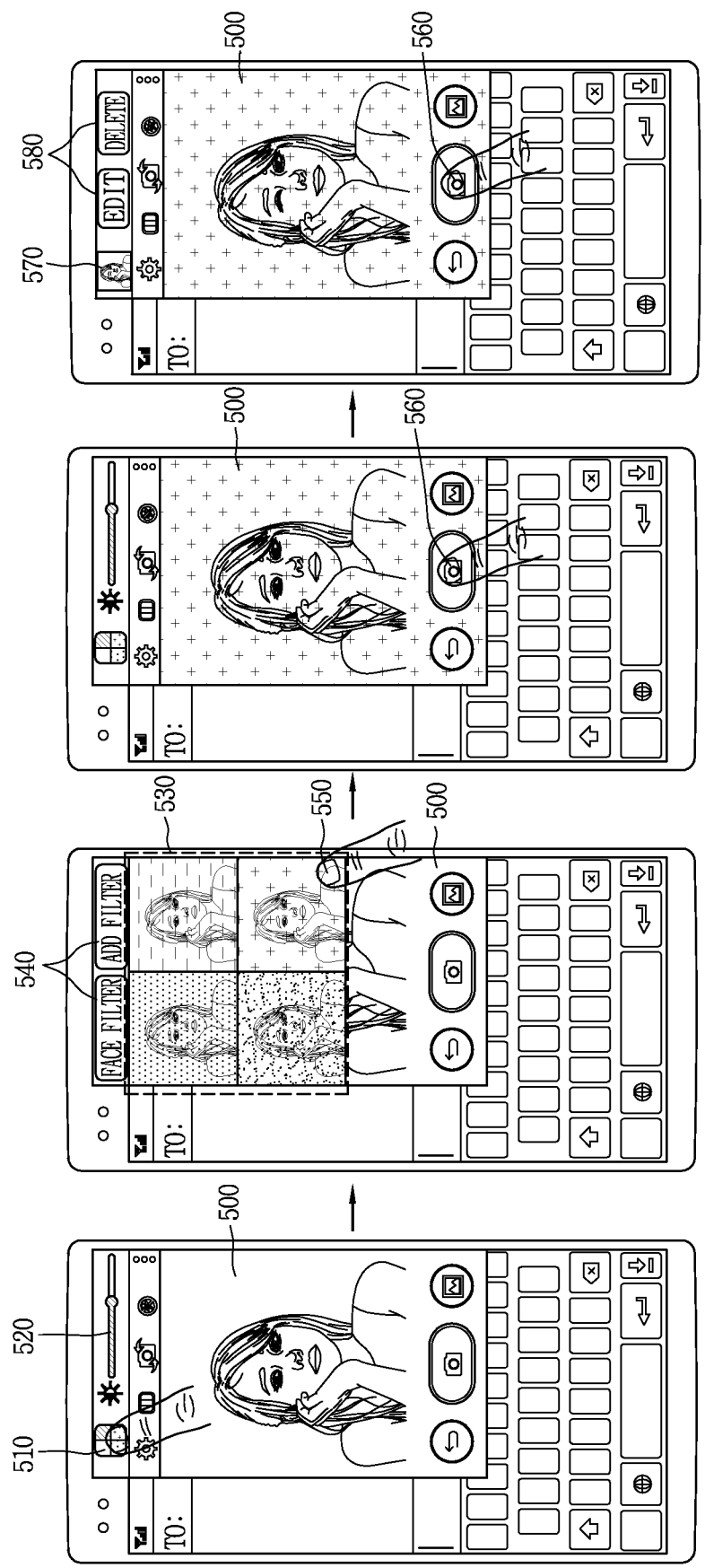
FIG. 5 is a conceptual view for explaining an embodiment of executing a camera application as illustrated in FIG. 4, and then capturing an image using a control icon displayed in an extended region.

FIG. 5 is a conceptual view for explaining an embodiment of executing a camera application as illustrated in FIG. 4, and then capturing an image using a control icon displayed in an extended region.

Referring to FIG. 5, as illustrated in FIG. 4, when a user input (swype down) for sliding downward subsequent to touching an icon 400 of a camera application is applied to the icon 420 of the camera application, an execution screen 420 of the camera application may be displayed in the main region 201.

For an embodiment, the execution screen 420 of the camera application may be displayed with a floating window on an execution screen of a messenger application being displayed in the main region 201. Here, the execution screen 420 of the camera application may be displayed in the vicinity to be linked to the extended region 202.

For another embodiment, icons for executing specific functions of the camera application may be displayed in the extended region 202. Here, the icons for executing specific functions may be displayed in consideration of a currently displayed content (preview image, captured image, etc.), a current process (whether it is prior to capture or immediately subsequent to capture, etc.), and the like.

Specifically, when a preview image 500 is being displayed in the main region 201, a lens setting icon, a capture image effect (filter) setting icon 510, a brightness adjustment bar 520, and the like may be displayed.

For another embodiment, icons for capture value setting may be displayed in different ways in the extended region 202 according to whether the camera is a front or rear camera.

For still another embodiment, additional icons (flash, front/rear camera switching, environment setting, mode setting, etc.) for capture value setting may be displayed at an upper end of the execution screen 420 of the camera application adjacent to the extended region 202.

For yet still another embodiment, when a drag input is applied in the left or right direction to the extended region 202, the additional icons may be displayed in a manner of turning over a list.

Subsequently, when a touch input is applied to the filter setting icon 510, preview images 530 to which an image effect is applied may be displayed on the preview image 500. Furthermore, icons 540 associated with filter effect settings, for example, an icon for exhibiting a face dedicated filter effect, an icon capable of downloading an additional filter, and the like may be displayed in the extended region 202.

For an embodiment that follows, when a touch input is applied to one preview image 550 of the preview images 530 to which an image effect is applied, the relevant image effect may be selected.

Furthermore, when a touch input is applied to a capture button 560, the relevant image effect may be applied to capture an image. Here, the image may be a still or moving image.

Accordingly, a thumbnail image 570 of the captured image may be displayed in the extended region 202. Furthermore, icons 580 for editing or attaching a capture image, for example, delete, save, makeup, immediate paste icon and the like may be displayed.

For an embodiment that follows, when a touch input is applied again to the capture button 560, an image may be captured again while maintaining the previously selected setting value. In other words, an image to which the previously selected image effect is applied may be captured.

Accordingly, the setting values may be maintained as they are until the camera application is ended as illustrated in FIG. 4. As a result, the camera application may be consecutively used.

Hereinafter, another embodiment that follows FIG. 5 will be described.

Figure 6:
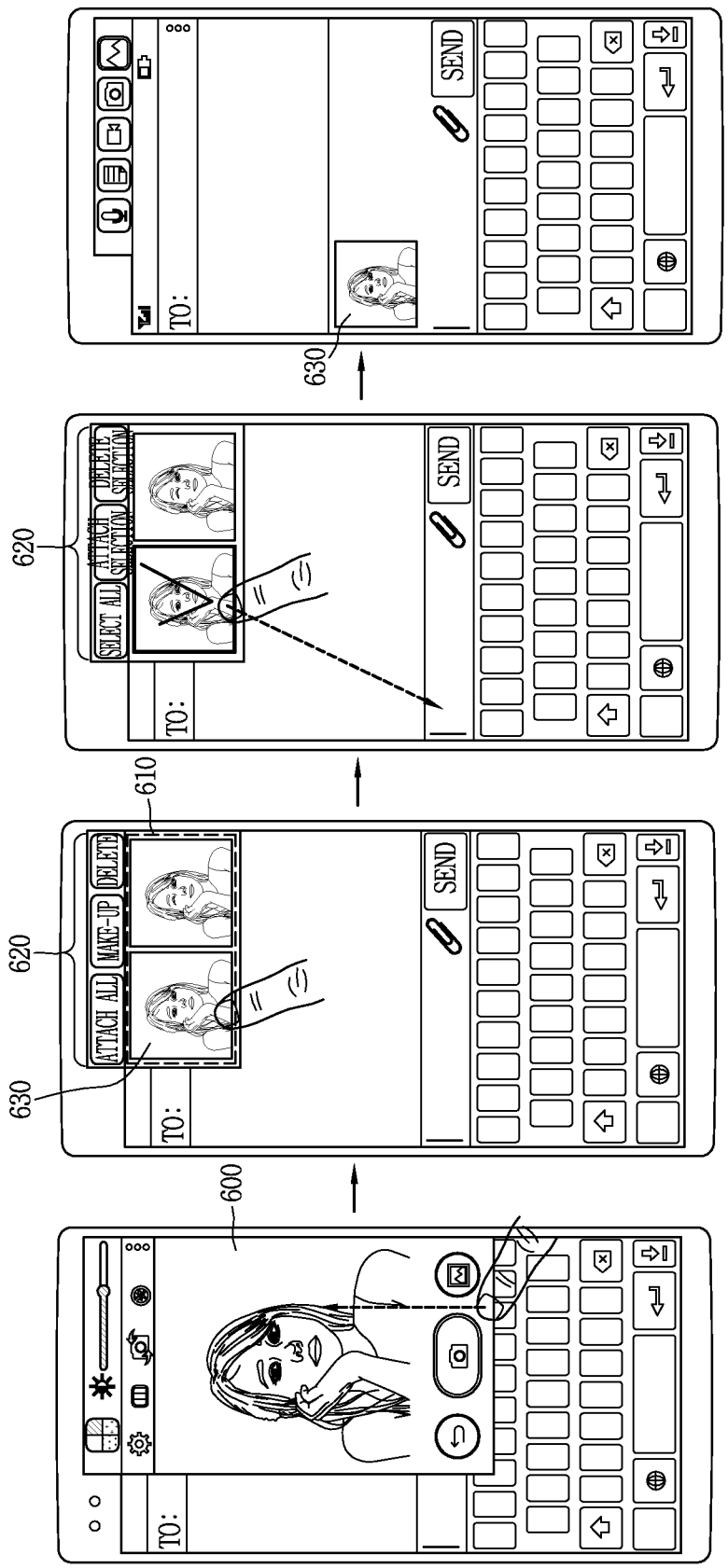
FIG. 6 is a conceptual view for explaining an embodiment of attaching an image selected from captured images is attached.

FIG. 6 is a conceptual view for explaining an embodiment of attaching an image selected from captured images is attached.

Referring to FIG. 6, for an embodiment that follows FIG. 5, as illustrated in FIG. 4 subsequent to capturing an image, when a user input (swype up) for sliding upward is applied to the execution screen 600 of the camera application, the execution of the camera application may be ended.

Accordingly, captured images 610 may be displayed on an upper tray of the main region 201. Furthermore, attach all, makeup, delete icon and the like (620) may be displayed in the extended region 202. In other words, icons 620 in consideration that images 610 captured immediately subsequent to the completion of the capture are being displayed may be displayed in the extended region 202.

Subsequently, when a long touch input is applied to one 630 of the captured images 610, icons with a function capable of executing in association with the selected image 630, for example, select all, attach selected image, delete selected image icon, and the like 640 may be displayed in the extended region 202.

For an embodiment, a touch input may be applied to one of the icons 640 to execute a function. Specifically, when a touch input is applied to the attach selected image icon, the selected image 630 may be displayed as an attached file on the input window of the messenger application being executed in the main region 201.

Here, an image effect distinguished from other images may be displayed on the selected image 630 being displayed on the upper tray. For example, the selected image 630 may be displayed with another color. For another example, a checkmark or the like may be displayed on the selected image 630.

For another embodiment, a drag input 650 from the main region 201 to the input window of the messenger application being executed may be applied to the selected image 630. As a result, the selected image 630 may be displayed as an attached file on the input window of the messenger application being executed in the main region 201.

On the other hand, the controller 180 may control the execution of the first application to capture an image and attach the captured image based on the application of a user input for image capture to the execution screen of the camera application.

Figure 7:
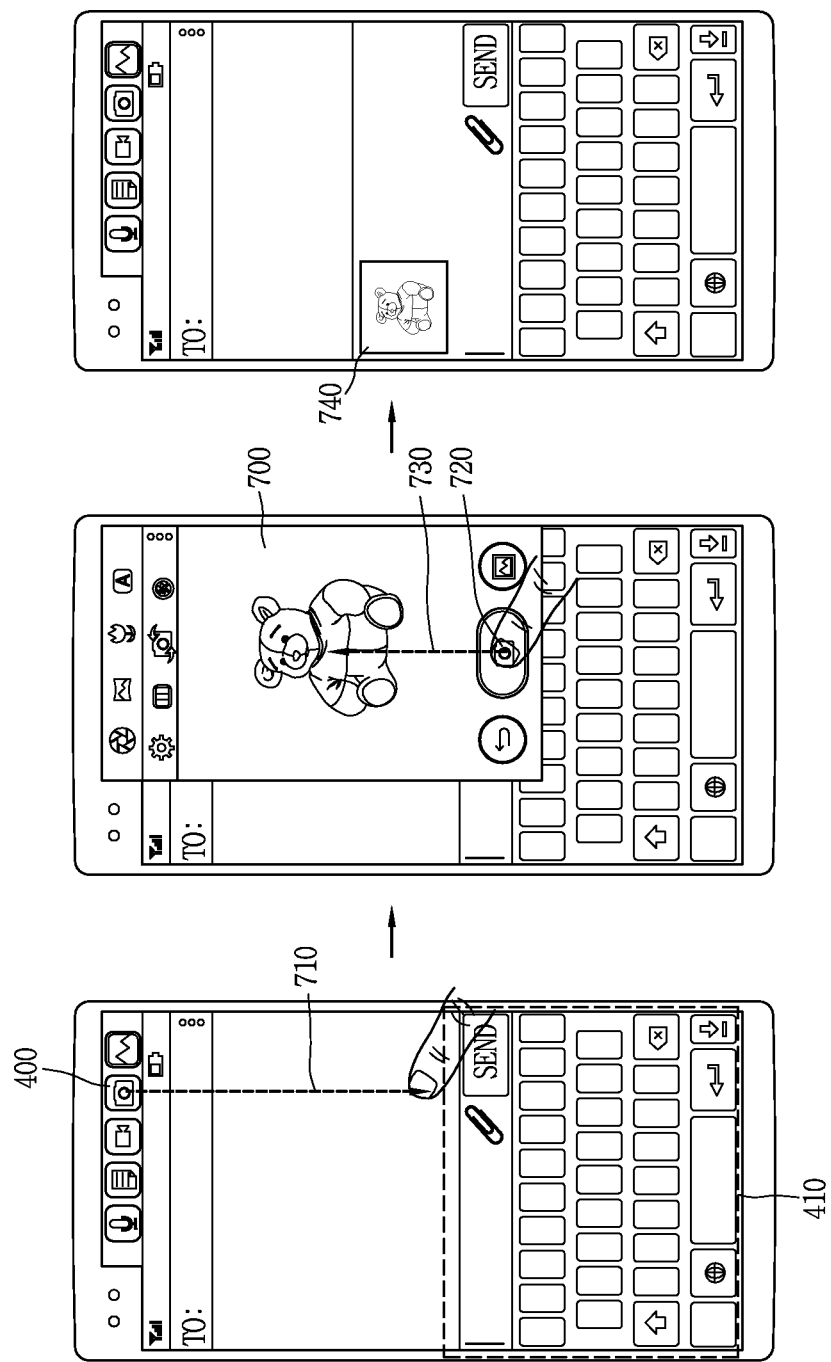
FIG. 7 is a conceptual view for explaining an embodiment of immediately attaching an image subsequent to capture.

FIG. 7 is a conceptual view for explaining an embodiment of immediately attaching an image subsequent to capture.

Referring to FIG. 7, as illustrated in FIG. 4, an execution screen of an application to which content is attachable may be displayed in the main region 201 of the display unit 200.

For an embodiment, due to the execution of mail, text message, SNS, memo, schedule management, messenger application or the like, a keyboard screen 410 for attaching text writing and file (content) attachment may be displayed in the main region 201 of the keyboard screen 410.

Furthermore, the icons of applications including attachable contents may be displayed in the extended region 202 of the display unit 200. For example, the icons of a camera, a photo album, an internet, a memo application, and the like may be displayed. Specifically, an icon of an application including content attachable to an application being executed in the main region 201 may be displayed in the extended region 202.

Subsequently, when a user input 710 for sliding downward subsequent to touching an icon 400 of the camera application is applied, an execution screen 700 of the camera application may be displayed in the main region 201.

For an embodiment, the execution screen 700 of the camera application may be displayed with a floating window on an execution screen of a messenger application being displayed in the main region 201. Here, the execution screen 700 of the camera application may be displayed in the vicinity to be linked to the extended region 202.

Icons for executing specific functions of the camera application may be displayed in the extended region 202. Here, the icons for executing specific functions may be displayed in consideration of a currently displayed content (preview image, captured image, etc.), a current process (whether it is prior to capture or immediately subsequent to capture, etc.), and the like.

Specifically, when a preview image 700 is being displayed in the main region 201, a lens setting icon, a capture image effect (filter) setting icon, a capture technique (panorama, auto, pop out, etc.), and the like may be displayed.

For another embodiment, icons for capture value setting may be displayed in different ways in the extended region 202 according to whether the camera is a front or rear camera.

For still another embodiment, additional icons (flash, front/rear camera switching, environment setting, mode setting, etc.) for capture value setting may be displayed at an upper end of the execution screen 700 of the camera application adjacent to the extended region 202.

For yet still another embodiment, when a drag input is applied in the left or right direction to the extended region 202, the additional icons may be displayed in a manner of turning over a list.

Then, when a user input 730 for sliding upward subsequent to pressing a camera capture icon 720 is applied, an image may be captured and the captured image 740 may be displayed as an attached file on the input window of the messenger application being executed in the main region 201. In other words, the execution of the camera application may be ended.

Figure 8:
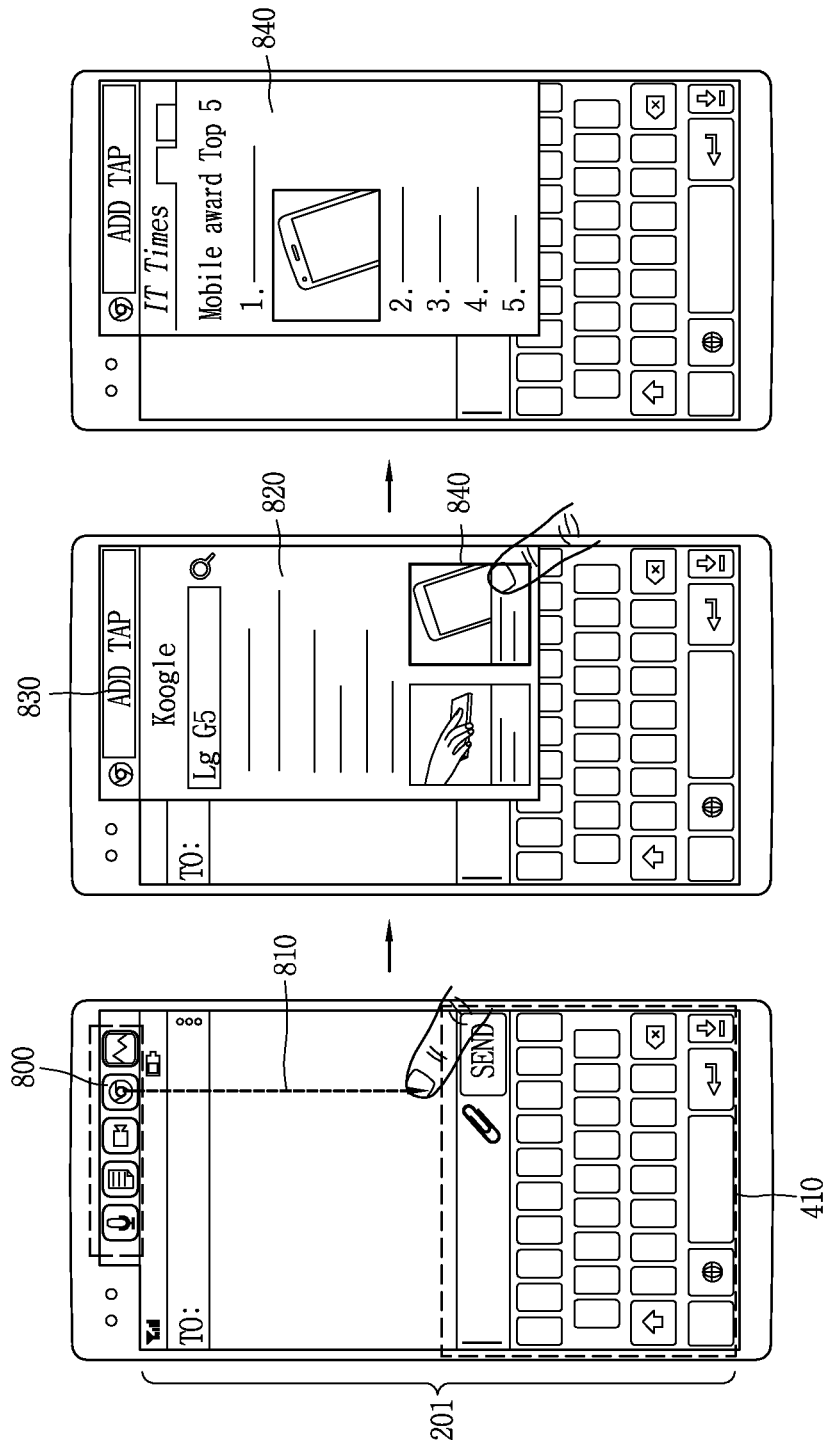
FIG. 8 is a conceptual view for explaining an embodiment in which when a messenger application is executed in a main region, the icons of applications including attachable contents are displayed in an extended region, and an internet application among them is selected and then executed.

According to an embodiment of FIG. 8, an image may be captured and then immediately attached to quickly and conveniently use a function execution of the camera application.

On the other hand, the controller 180 may display an execution screen of an internet application in one region of the main region 201 based on a preset user interface applied to an icon of the internet application among the icons.

For an embodiment, the controller 180 may control the execution of the first application to attach a selected content based on the application of a user input for selecting at least one content to the execution screen of the internet application.

FIG. 8 is a conceptual view for explaining an embodiment in which when a messenger application is executed in a main region, the icons of applications including attachable contents are displayed in an extended region, and an internet application among them is selected and then executed.

Referring to FIG. 8, an execution screen of an application to which content is attachable may be displayed in the main region 201 of the display unit 200.

For an embodiment, due to the execution of mail, text message, SNS, memo, schedule management, messenger application or the like, a keyboard screen 410 for attaching text writing and file (content) attachment may be displayed in the main region 201 of the keyboard screen 410.

Furthermore, the icons of applications including attachable contents may be displayed in the extended region 202 of the display unit 200. For example, the icons of a camera, a photo album, an internet, a memo application, and the like may be displayed. Specifically, an icon of an application including content attachable to an application being executed in the main region 201 may be displayed in the extended region 202.

Subsequently, when a user input 810 for sliding downward subsequent to touching an icon 800 of the internet application is applied, an execution screen 820 of the internet application may be displayed in the main region 201.

For an embodiment, the execution screen 820 of the internet application may be displayed with a floating window on an execution screen of a messenger application being displayed in the main region 201. Here, the execution screen 820 of the internet application may be displayed in the vicinity to be linked to the extended region 202.

Icons for executing specific functions of the internet application may be displayed in the extended region 202. Here, the icons for executing specific functions may be displayed in consideration of a currently displayed content and circumstance and the like.

For an embodiment, icons for executing the same function as that of a browser may be displayed. Specifically, an icon for adding to a bookmark page, a message 830 indicating a touch for generating a new tab, and the like may be displayed.

For another embodiment, when a touch input is applied to a search result content 840 in an internet application, the detailed content of the relevant content 840 may be displayed on a floating window.

Figure 9:
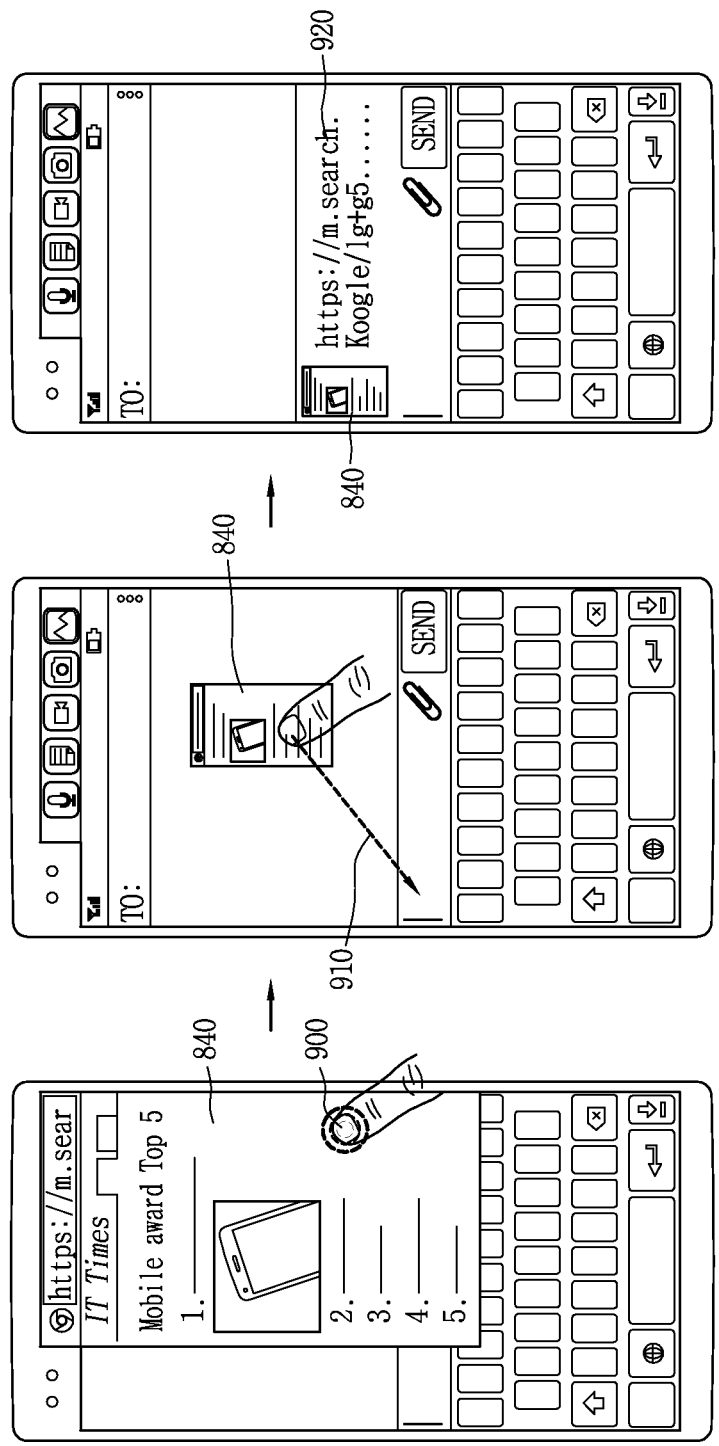
FIG. 9 is a conceptual view for explaining an embodiment executing an internet application as illustrated in FIG. 8, and then attaching content thereto.

FIG. 9 is a conceptual view for explaining an embodiment executing an internet application as illustrated in FIG. 8, and then attaching content thereto.

For an embodiment that follows, referring to FIG. 9, when a long touch or force touch input is applied to the search content 840, the relevant content 840 may be converted in an attachable form.

For an embodiment, the relevant content 840 may be captured and stored. Furthermore, a link of the relevant content 840 may be copied and shared.

For an specific embodiment, when a force touch input 900 is applied to the search content 840, a size of the relevant content 840 may be reduced and converted into a draggable state.

Subsequently, when a drag input 910 is applied to an input window of a messenger application being displayed in the main region 201, the relevant content 840 may be attached to the messenger application, and displayed as an attached file on the input window. Furthermore, a link address or the like 920 of the relevant content 840 may be copied to the input window of the messenger application.

Figure 10:
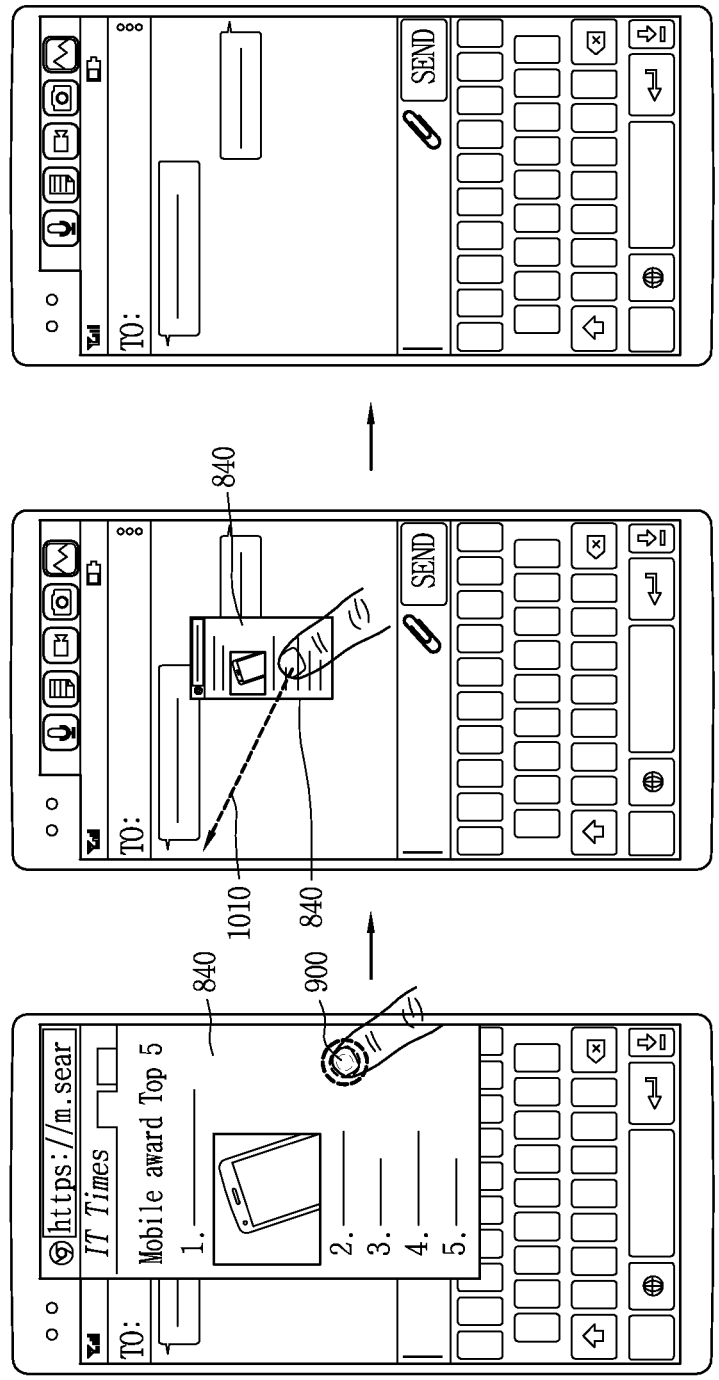
FIG. 10 is a conceptual view for explaining an embodiment incapable of attaching content.

FIG. 10 is a conceptual view for explaining an embodiment incapable of attaching content.

Referring to FIG. 10, when a force touch input 900 is applied to the search content 840, a size of the relevant content 840 may be reduced and converted into a draggable state.

For an embodiment, the transparency of the relevant content 840 may be increased to show the conversation content of the messenger application being displayed in the main region 201. Furthermore, the relevant content 840 may be captured and then stored.

Subsequently, contrary to FIG. 9, when a drag input 1010 is applied to a region other than the input window of the messenger application, the relevant content 840 may disappear without being attached. Furthermore, the execution of the internet application may be ended.

On the other hand, the controller 180 may display a control icon for internet page switching in the second region 202 based on the execution screen of the internet application being displayed in one region of the first region 201.

Figure 11:
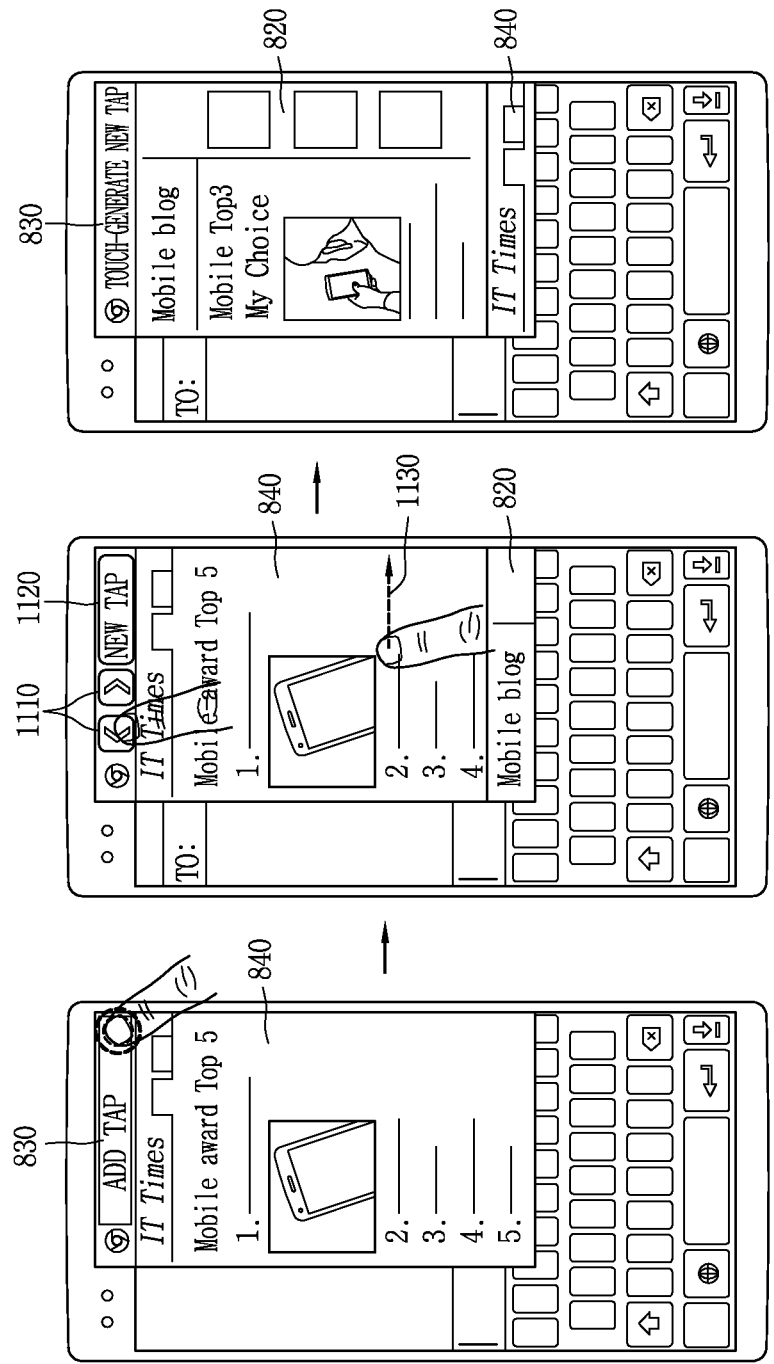
FIG. 11 is a conceptual view for explaining an embodiment of adding a tap icon for switching a web page to an extended region.

FIG. 11 is a conceptual view for explaining an embodiment of adding a tap icon for switching a web page to an extended region.

Referring to FIG. 11, as illustrated in FIG. 8, when a touch input is applied to the search result content 840 in the internet application, the detailed content of the relevant content 840 may be displayed on a floating window of the main region 201.

Furthermore, when a touch input is applied to an icon 830 for generating a new tab in the extended region 202, a left or right tab switching icon 1110 and an icon 1120 for generating a new tab, and the like may be displayed in the extended region 202.

Accordingly, the screen of the search result content 840 may be preferentially (on an upper layer) displayed on the floating window of the main region 201. Furthermore, an execution screen 820 of the internet application that has been initially executed may be partially shown at a lower side of the execution screen 820. Subsequently, when a touch input is applied to the page switching icon 1110 (left or right tab switching icon), the execution screen 820 of the internet application that has been initially executed may be preferentially (on an upper layer) displayed on the floating window.

For another embodiment, a touch input may be applied to the page switching icon 1110 to display a web page screen that has been executed. Specifically, a touch input may be applied to the left page switching icon to preferentially (on an upper layer) display a web page that has been executed prior to a web page currently being displayed.

Similarly, a touch input may be applied to the right page switching icon to preferentially (on an upper layer) display a web page that has been executed subsequent to a web page currently being displayed. In other words, it may be possible to check a search history of the web pages.

For another embodiment, when a swype input 130 to the left or right side is applied to a web page being displayed, the relevant web page may be deleted. As a result, when only one web page remains, the tap switching icon 1110 may disappear.

On the contrary, when switching between a plurality of web pages is allowed even during the deletion of the relevant web page, the tap switching icon 1110 may be continuously displayed.

On the other hand, a drag input may be applied to the extended region 202 from the main region 201 to execute a function of an application being displayed in the extended region 202.

Figure 12:
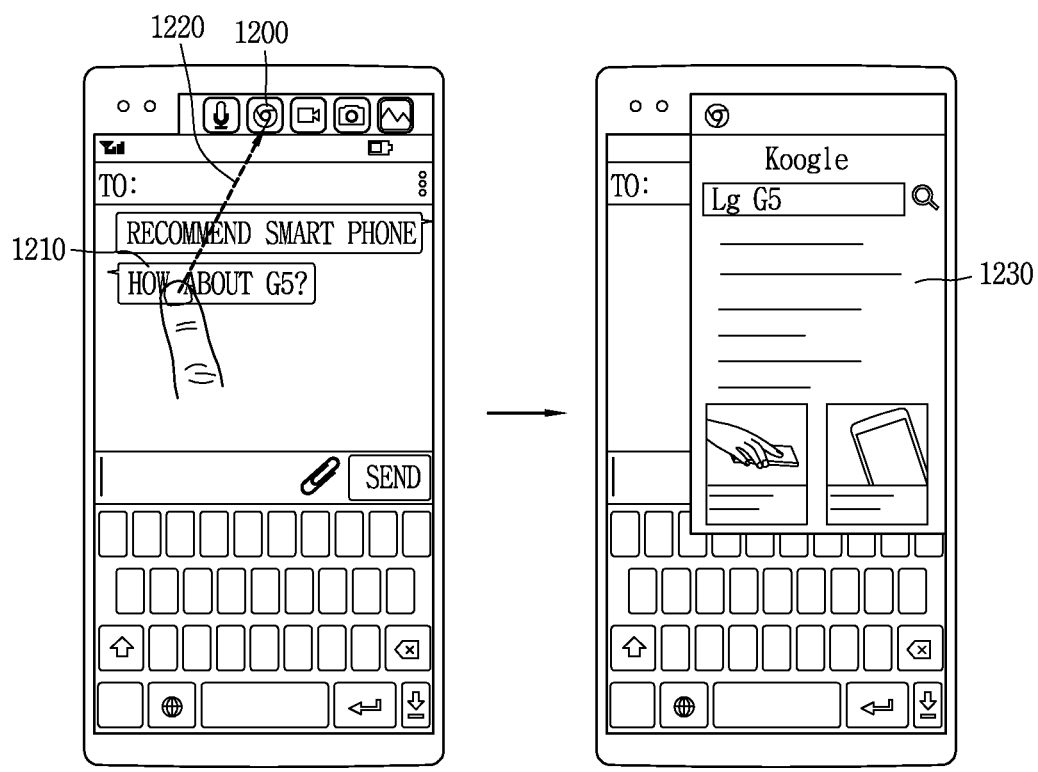
FIG. 12 is a conceptual view for explaining an embodiment of dragging a message is dragged to an extended region to execute an internet application.

FIG. 12 is a conceptual view for explaining an embodiment of dragging a message is dragged to an extended region to execute an internet application.

Referring to FIG. 12, a drag input 1220 to a browser application icon 1200 being displayed in the extended region 202 may be applied to a specific message 1210 among the conversation contents of the messenger application being displayed in the main region 201.

Accordingly, a result 1230 of searching a content (text) included in the specific message 1210 may be displayed on the floating window of the main region 201. Here, the entire or partial of the content of the specific message may be shown in the extended region 202.

For another embodiment, the transparency of the floating window displayed with the search result 1230 may be adjusted to show the content of a messenger conversation through the floating window.

For still another embodiment, a content (text) included in a specific message to be searched may be automatically chosen as a frequently mentioned or preset content, a content that has been frequently searched or the like among the conversation content.

For yet still another embodiment, it may be derived from the sentence structure of a specific message. Specifically, an object, a noun, a proper noun or the like of the specific message may be automatically chosen as a content that has been frequently searched.

For still yet another embodiment, a user may apply a touch input to a portion displayed with a text to be searched among a specific message to directly indicate the text to be searched. In other words, a touch input may be applied to portion "A", and apply a drag input to a side of the browser icon 1200.

On the other hand, as described above, the icons of applications including content attachable to an application being executed in the main region 201 may be displayed in the extended region 202.

Figure 13:
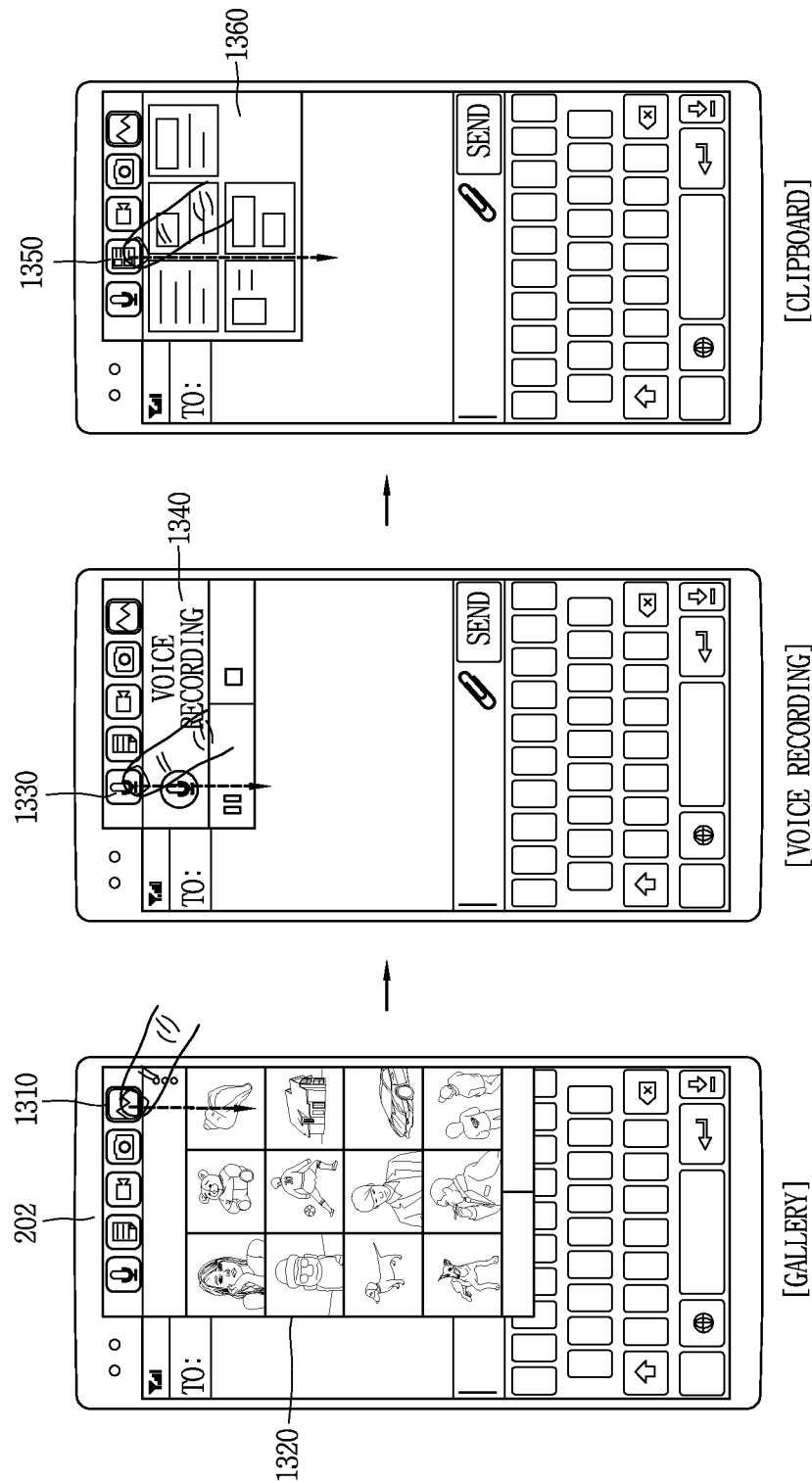
FIG. 13 is a conceptual view for explaining an embodiment of an application including contents attachable to a message application.

FIG. 13 is a conceptual view for explaining an embodiment of an application including contents attachable to a message application.

Referring to FIG. 13, as illustrated in FIG. 4, an execution screen of an application to which content is attachable may be displayed in the main region 201 of the display unit 200.

For an embodiment, due to the execution of mail, text message, SNS, memo, schedule management, messenger application or the like, a keyboard screen for attaching text writing and file (content) attachment may be displayed in the main region 201 of the keyboard screen 410.

Furthermore, the icons of applications including attachable contents may be displayed in the extended region 202 of the display unit 200. For example, the icons of a camera, a photo album, an internet, a memo application, and the like may be displayed.

For an embodiment, when a user input (swype down) for sliding downward subsequent to touching an icon 1310 of the photo album application is applied, an execution screen 1320 of the photo album application may be displayed in the main region 201.

Here, the execution screen 1320 of the photo album application may be displayed with a floating window on an execution screen of a messenger application being displayed in the main region 201. Furthermore, the execution screen 1320 of the photo album application may be displayed in the vicinity to be linked to the extended region 202.

For still another embodiment, when a user input for sliding downward subsequent to touching an icon 1330 of a voice recording application is applied, an execution screen 1340 of the voice recording application may be displayed with a floating window of the main region 201.

For yet still another embodiment, when a swype down input for sliding downward subsequent to touching an icon 1350 of the clipboard application is applied, an execution screen 1360 of the voice recording application may be displayed with a floating window of the main region 201.

According to the embodiment of FIG. 13, a messenger application may attach various types of files such as images, videos, voice files, existing stored contents, and the like.

Subsequently, when a drag input to a message input window of the main region 201 is applied to a content contained in the floating window, the relevant content may be displayed as an attached file on the input window of the messenger application.

On the other hand, the controller 180 may switch the execution screens of the first application and the second application, and the display directions of the control icons based on the application of a preset user input.

Figure 14:
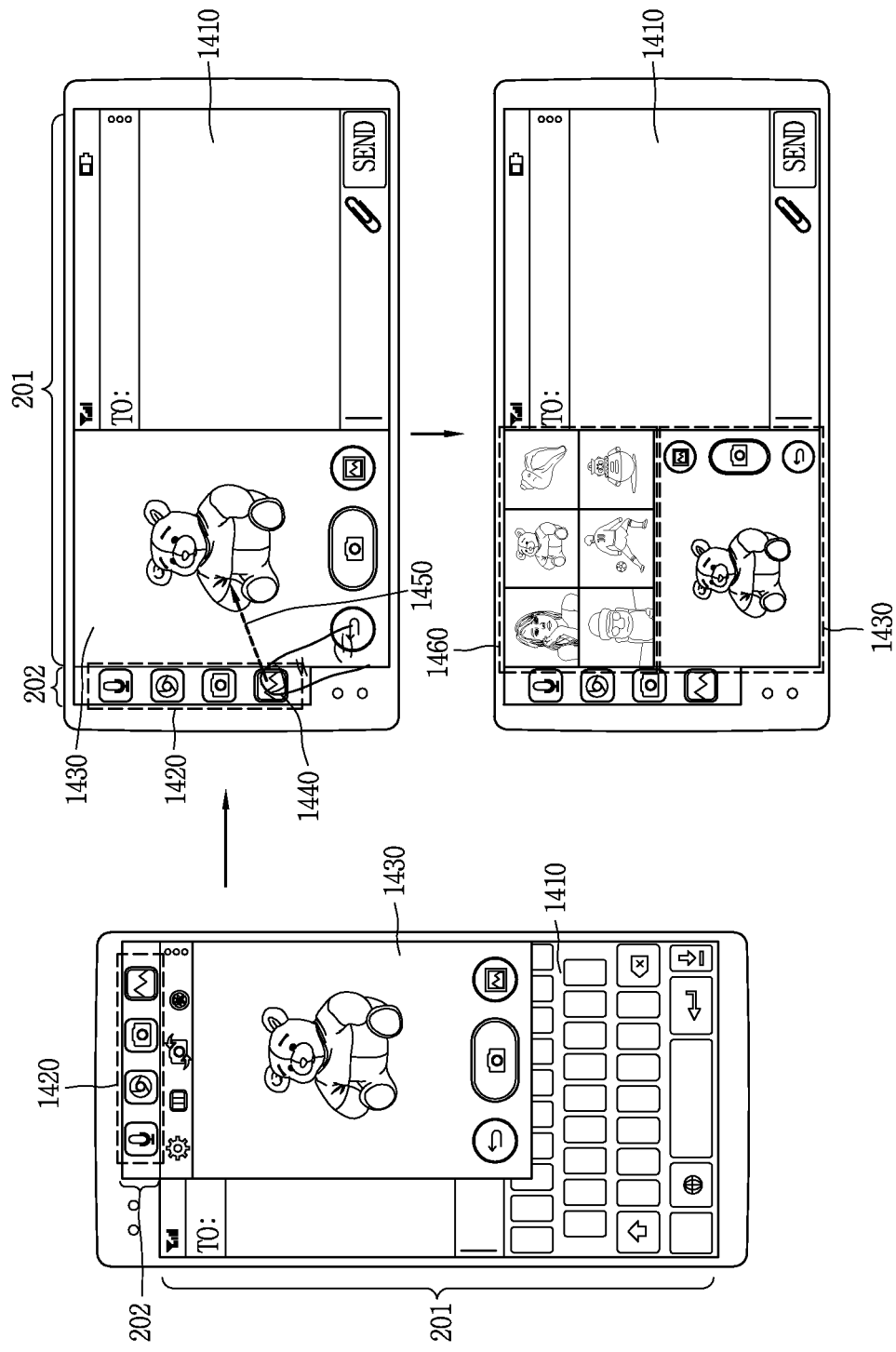
FIG. 14 is a conceptual view for explaining an embodiment of display mode switching.

FIG. 14 is a conceptual view for explaining an embodiment of display mode switching.

Referring to FIG. 14, as described above, when an execution screen 1410 of a messenger application is displayed in the main region 201, the icons 1420 of applications including attachable contents in a messenger may be displayed in the extended region 202.

Furthermore, a user input (swype down) for sliding downward subsequent to touching an icon of the camera application is applied among the icons 1420, an execution screen 1430 of the camera application may be displayed in the main region 201.

For an embodiment, the execution screen 1430 of the camera application may be displayed with a floating window on an execution screen of a messenger application being displayed in the main region 201. Here, the execution screen 1430 of the camera application may be displayed in the vicinity to be linked to the extended region 202.

Subsequently, a user may apply a touch input to an icon for rotating the terminal 100 to the left or right side by 90 degrees or switching the display direction to switch a display mode to a horizontal mode from a vertical mode.

Specifically, the vertical mode denotes a state in which the extended region 202 is disposed at an upper side of the display unit 200, and the horizontal mode denotes a state in which the extended region 202 is disposed at the left or right side of the display unit 200.

As being switched to a horizontal mode as described above, an execution screen 1410 of the messenger application and an execution screen 1420 of the camera application being displayed in the main region 201 may be rotated by 90 degrees.

For an embodiment, as being switched to a horizontal mode, the main region 201 may be divided (entering into a split mode) to display the execution screen 1410 of the messenger application in one region, and display the execution screen 1430 of the camera application in the remaining divided region. Furthermore, the icons 1420 being displayed in the extended region 202 may be rotated by 90 degrees.

For another embodiment, a divided region in which the execution screen 1430 of the camera application may be displayed in the vicinity to be linked to the extended region 202.

For still another embodiment, when a drag input to a region in which the photo album application is desired to be carried out is applied to an icon 1440 of the photo album application being displayed in the extended region 202, an execution screen 1460 of the photo album application may be displayed in the relevant region.

Specifically, a drag input 1450 to an upper left end of the main region 201 may be applied to an icon 1440 of the photo album application being displayed in the extended region 202.

Accordingly, the main region 201 may be divided into three regions, an execution screen 1460 of the photo album application, an execution screen 1430 of the camera application, and an execution screen 1420 of the messenger application may be respectively displayed in an upper left region, a lower left region, and a right region.

Figure 15:
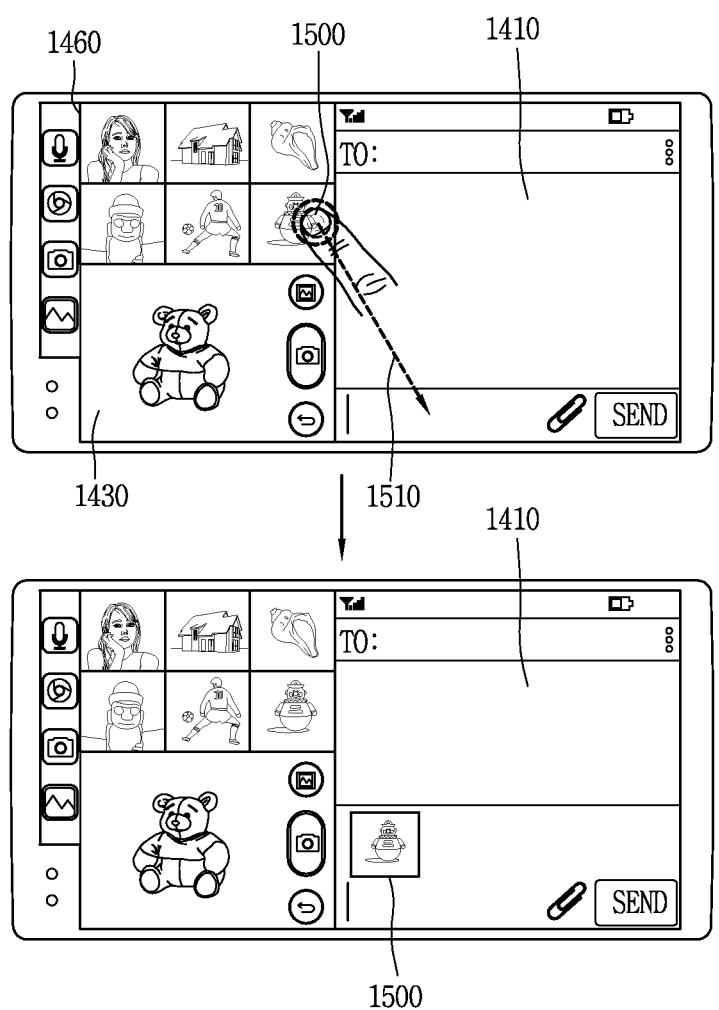
FIG. 15 is a conceptual view for explaining an embodiment of attaching an image in a horizontal mode.

FIG. 15 is a conceptual view for explaining an embodiment of attaching an image in a horizontal mode.

For an embodiment that follows FIG. 14, referring to FIG. 15, a long touch input may be applied to select one image 1500 on the execution screen 1460 of the photo album application. Subsequently, when a drag input 1510 to an input window side of the messenger application execution screen 1410 is applied, the selected image 1500 may be attached to the messenger application.

Figure 16:
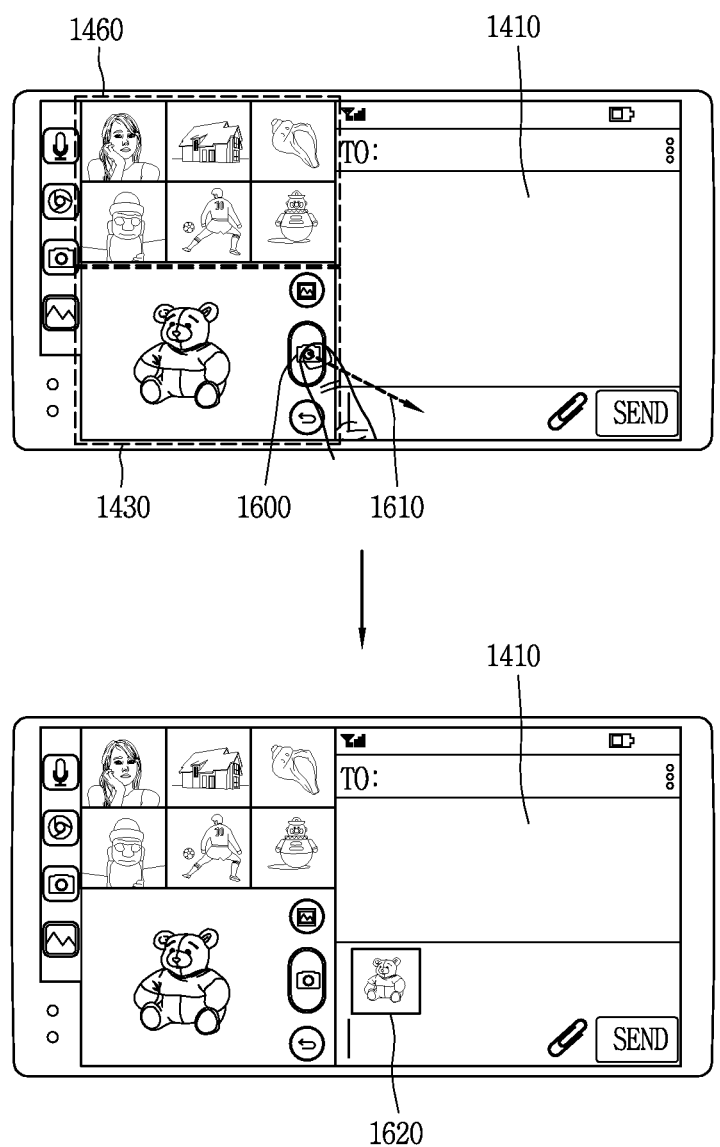
FIG. 16 is a conceptual view for explaining an embodiment of capturing in a horizontal mode and then immediately attaching an image.

FIG. 16 is a conceptual view for explaining an embodiment of capturing in a horizontal mode and then immediately attaching an image.

For another embodiment that follows FIG. 14, referring to FIG. 16, an input for pressing a capture button 1600 of the camera application may be applied, and then an input 1610 for dragging to an input window side of the messenger application may be applied.

Accordingly, an image may be captured, and the captured image 1620 may be attached to the messenger application. In other words, the captured image may be immediately attached to the messenger application.

On the other hand, when one of divided regions in which a plurality of applications are respectively carried out is selected, a control icon for executing a specific function of an application executed in the selected divided region may be displayed in the extended region 202.

Figure 17:
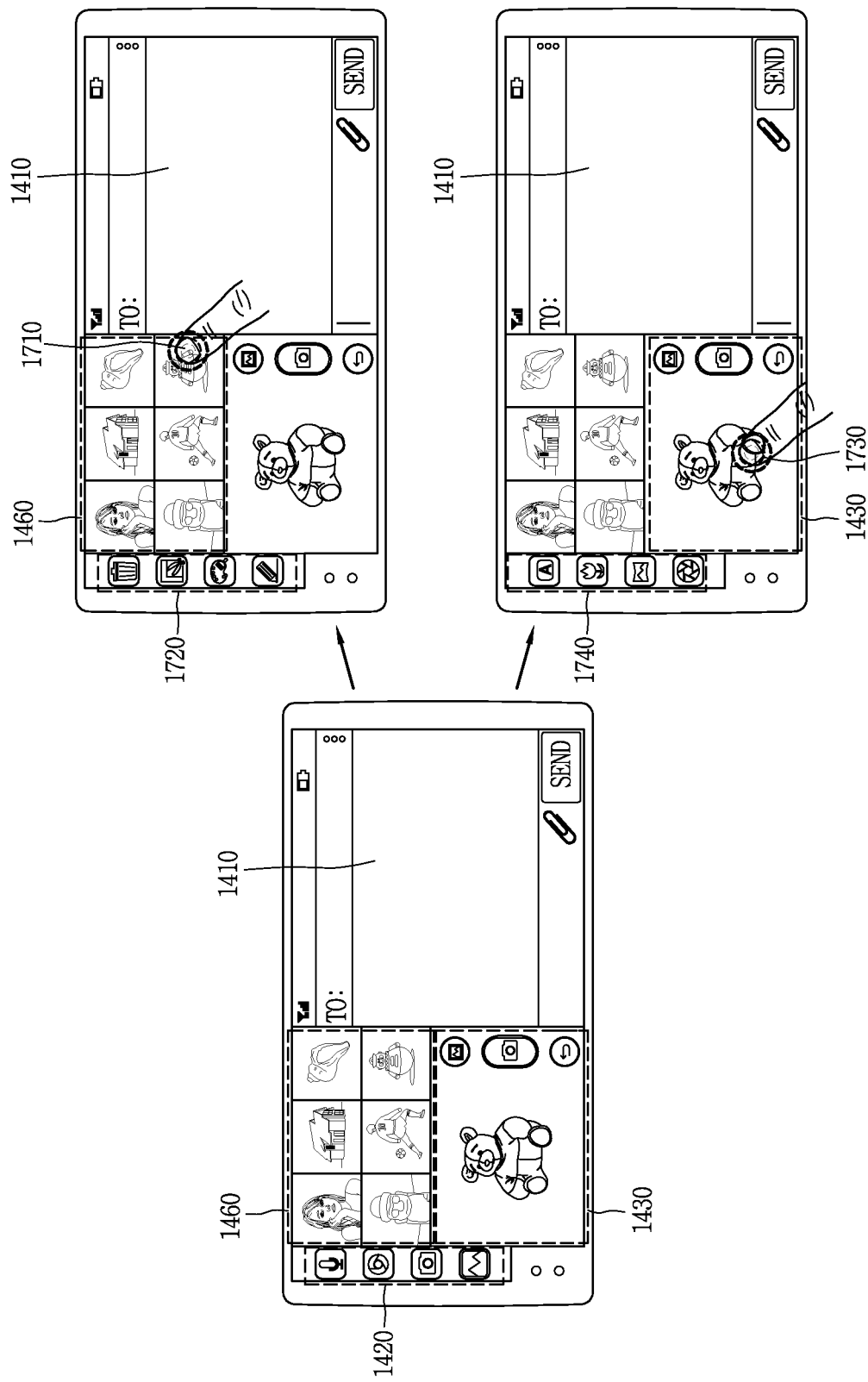
FIG. 17 is a conceptual view for explaining an embodiment in which an icon for controlling a selected application is displayed in an extended region during the execution of a plurality of applications.

FIG. 17 is a conceptual view for explaining an embodiment in which an icon for controlling a selected application is displayed in an extended region during the execution of a plurality of applications.

For another embodiment that follows FIG. 14, referring to FIG. 17, when a touch input 1710 is applied to the execution screen 1460 of the photo album application, an effect of indicating that the relevant divided region has been selected may be displayed.

For example, a bold line or blinking effect may be displayed at an upper left end region boundary of the main region 201, which is a selected divided region.

Furthermore, icons 1720 for executing a specific function of the photo album application may be displayed in the extended region 202. For example, delete, makeup, attach all icon and the like 1720 may be displayed in the extended region 202.

For another embodiment, when a touch input 1730 is applied to the execution screen 1430 of the camera application, an effect of exhibiting that the relevant divided region has been selected may be displayed.

For example, a bold line or blinking effect may be displayed at an upper left end region boundary of the main region 201, which is a selected divided region.

Furthermore, icons 1740 for executing a specific function of the photo album application may be displayed in the extended region 202. For example, lens setting, automatic, panorama capture icon and the like 1740 may be displayed in the extended region 202.

Figure 18:
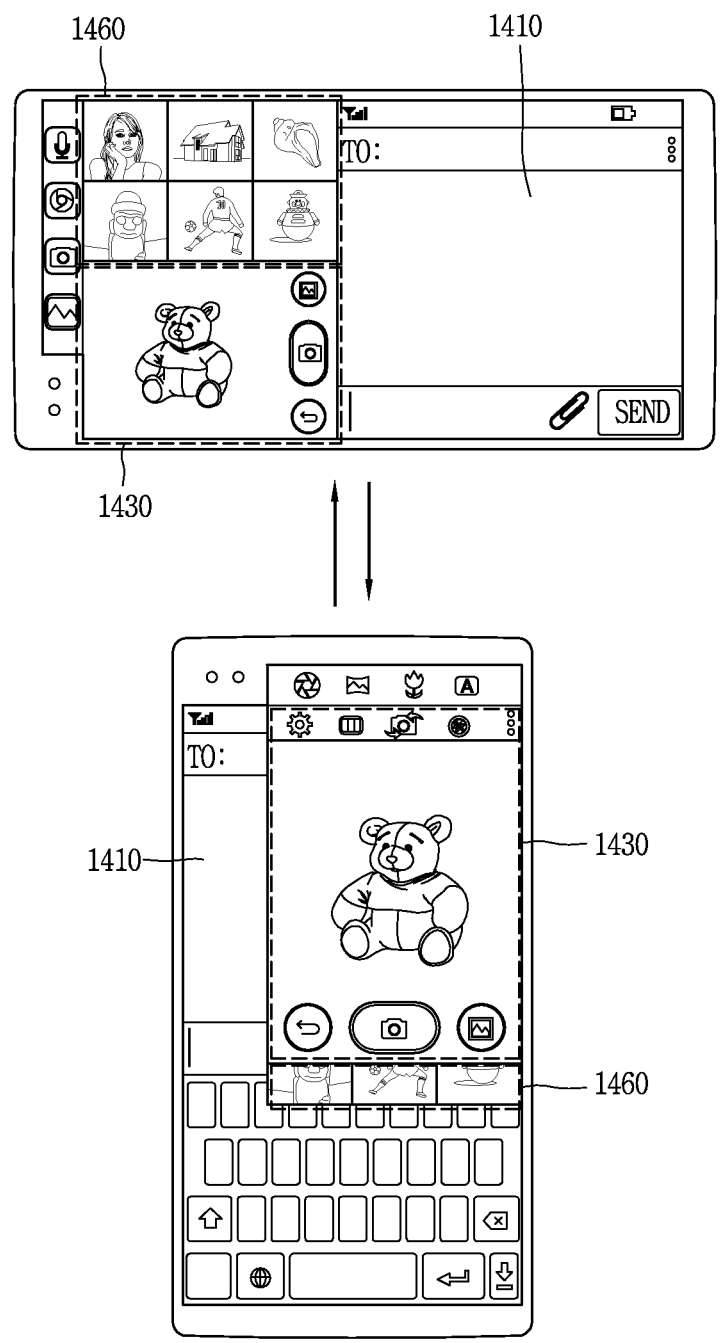
FIG. 18 is a conceptual view for explaining an embodiment of displaying a plurality of applications in horizontal and vertical modes.

FIG. 18 is a conceptual view for explaining an embodiment of displaying a plurality of applications in horizontal and vertical modes.

For another embodiment that follows FIG. 14, referring to FIG. 18, a user may apply a touch input to a screen display direction switching icon or rotate the terminal 100, thereby switching from a horizontal mode to a vertical mode again.

For an embodiment, the execution screen 1430 of the camera application may be displayed on an upper floating window, and the execution screen 1460 of the photo album application may be displayed on a lower floating window. Here, part of the execution screen 1460 of the photo album application being displayed on the lower floating window may be shown in an overlapping manner.

For another embodiment, the upper and lower order of applications being displayed may be determined according to an order in which the applications have been carried out or an application that has been carried out immediately prior to screen switching.

Specifically, when the camera application is used immediately prior to being switched again to a vertical mode, the execution screen 1430 of the camera application may be displayed on an upper floating window, and the execution screen 1450 of the photo album application may be displayed on a lower floating window.

Alternatively, when the camera application is carried out earlier than the photo album application, the execution screen 1430 of the camera application may be displayed on an upper floating window, and the execution screen 1450 of the photo album application may be displayed on a lower floating window.

For another embodiment, a user may apply a swype to the left or right, a flicking input or the like to switch the displayed execution screen. Specifically, when a left or right flicking input is applied to the execution screen 1430 of the camera application, the execution screen 1430 of the photo album application may be displayed on an upper floating window, and the execution screen 1450 of the camera application may be displayed on a lower floating window.

For still another embodiment, a control icon for executing a specific function of an application being displayed on an upper floating window in a vertical mode may be displayed in the extended region 202.

Specifically, icons capable of setting capture techniques such as lens setting, capture effect setting, automatic, panorama and the like for executing a specific function of the photo album application may be displayed in the extended region 202.

Figure 19:
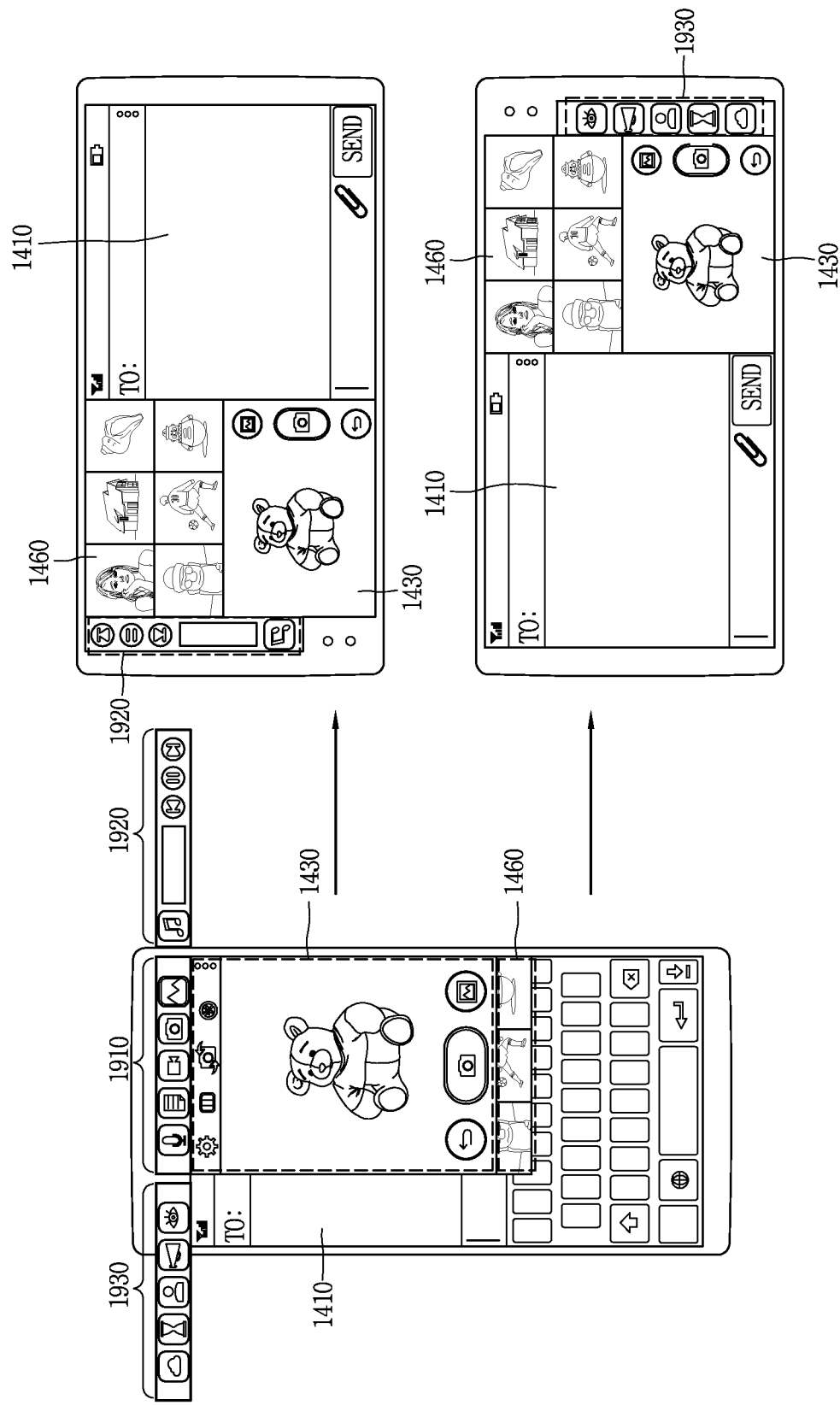
FIG. 19 is a conceptual view for explaining an embodiment of an icon displayed in an extended region according to left and right rotational directions.

FIG. 19 is a conceptual view for explaining an embodiment of an icon displayed in an extended region according to left and right rotational directions.

Referring to FIG. 19, icons 1910 including attachable contents in a messenger application being displayed in the main region 201 may be displayed in the extended region 202 in a vertical mode.

For an embodiment, when a drag to the left or right, a flicking or swype input is applied to the extended region 202, a list of icons may be turned over. Specifically, when a swype input to the left is applied, a playback list 1920 of music currently being played back may be displayed in the extended region 202.

For another embodiment, when a swype input is applied to the right side, the icons 1930 of clock, schedule management, phone, message application or the like, which are preset to be displayed may be displayed in the extended region 202.

For still another embodiment, when the mobile terminal 100 is rotated to dispose the extended region 202 at the left side of the main region 201, a playback list 1920 of music currently being played back that has been the most right list in a vertical mode may be displayed in the extended region 202.

For yet still another embodiment, when the mobile terminal 100 is rotated to dispose the extended region 202 at the right side of the main region 201, the icons 1930 of clock, schedule management, phone, message application or the like, which are preset that have been the most left list in a vertical mode, may be displayed in the extended region 202.

As described above, according to the embodiment of FIG. 19, the lists 1910, 1920, 1930 of icons may be displayed in the gravity direction.

FIG. 20 is a conceptual view for explaining an embodiment in which a recently used application is shown by a user input.

Referring to FIG. 20, as described above, an execution screen of an application may be respectively displayed in divided regions in a horizontal mode.

Subsequently, a gesture for likely cutting between the main region 201 and the extended region 202 is applied, the screen may be additionally divided to display the lists 2000 of applications that have been recently carried out in the divided regions.

Figure 21:
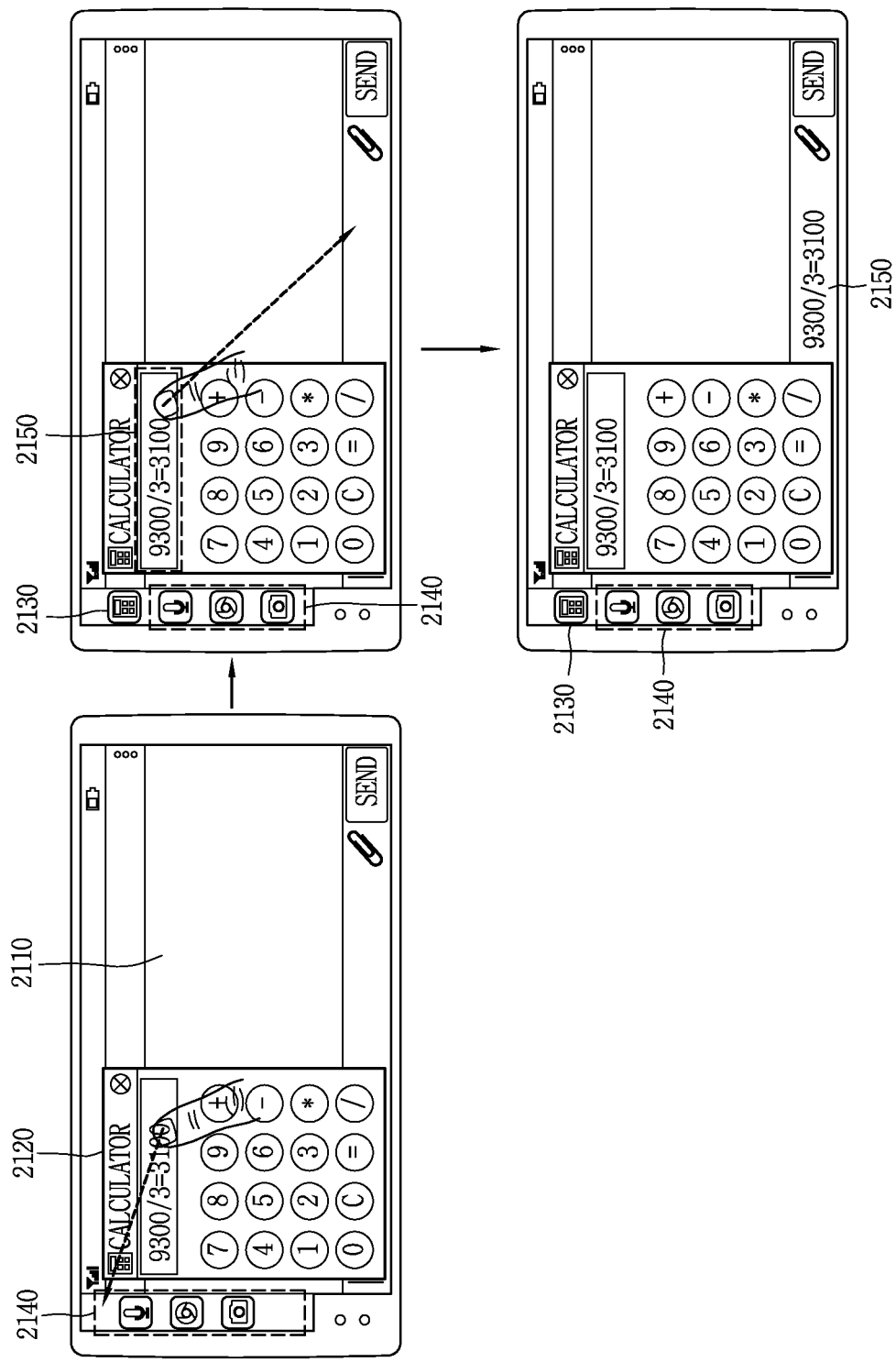
FIG. 21 is a conceptual view for explaining an embodiment of adding an application being executed to a list of applications including attachable contents.

FIG. 21 is a conceptual view for explaining an embodiment of adding an application being executed to a list of applications including attachable contents.

Referring to FIG. 21, in a horizontal mode, an execution screen 2110 of a messenger application may be displayed in the first region, and an execution screen 2120 of a calculator application may be displayed in the second region.

For an embodiment, the icons 2140 of photo album, voice recording, camera application or the like including attachable contents in a messenger application may be displayed in the extended region 202.

For another embodiment, when a drag input to a side of the extended region 202 is applied to the execution screen 2120 of the calculator application, an icon 2130 of the calculator application may be displayed in the extended region 202.

In other words, when a messenger application is carried out in the main region 201, a calculator application may be added as one of applications including attachable contents in the messenger application.

For still another embodiment, when a specific text 2150 such as a calculation result or the like is selected on the execution screen 2120 of the calculator application, and then a drag input is applied to the input window of the messenger application, the calculation result 2150 may be displayed on the input window of the messenger application.

On the other hand, the controller may consecutively capture a plurality of images and display the captured plurality of images in one region of the first region based on a preset user input applied to an icon of a camera application among the icons, and control the execution screen of the camera application to attach a selected image based on the application of a user input for selecting at least one image of the plurality of images.

Figure 22:
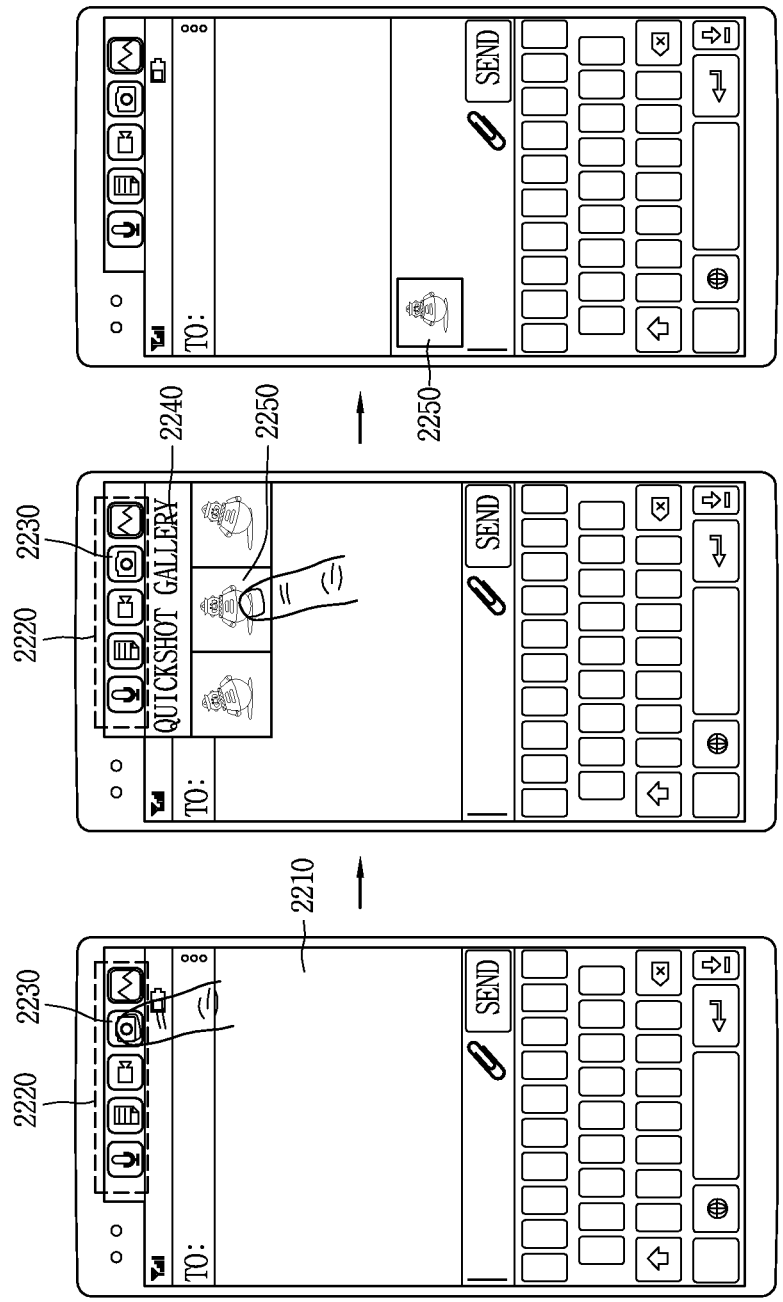
FIG. 22 is a conceptual view for explaining an embodiment of adding an image subsequent to consecutive captures.

FIG. 22 is a conceptual view for explaining an embodiment of adding an image subsequent to consecutive captures.

Referring to FIG. 22, when an execution screen 2210 of the messenger application is displayed in the main region 201, the icons 2220 of applications including attachable contents in the messenger application may be displayed in the extended region 202.

For an embodiment, a double tap input may be applied to an icon 2230 of the camera application among the icons 2220, and then an input for touching for a predetermined period of time may be applied. As a result, photos may be consecutively captured while applying the touch input.

Specifically, a consecutive capture may be carried out while pressing a long press input. Accordingly, a gallery 2240 for showing consecutively captured images may be automatically generated and listed up in real time. The gallery 2240 may be displayed on a floating window in an instant popup form.

Subsequently, when a touch input is applied to one 2250 of the consecutively captured images, the relevant image 2250 may be immediately attached to the messenger application.

As described above, according to the embodiment of FIG. 22, the gallery 2240 for showing consecutively captured images will disappear when attached while at the same selecting a captured image.

Figure 23:
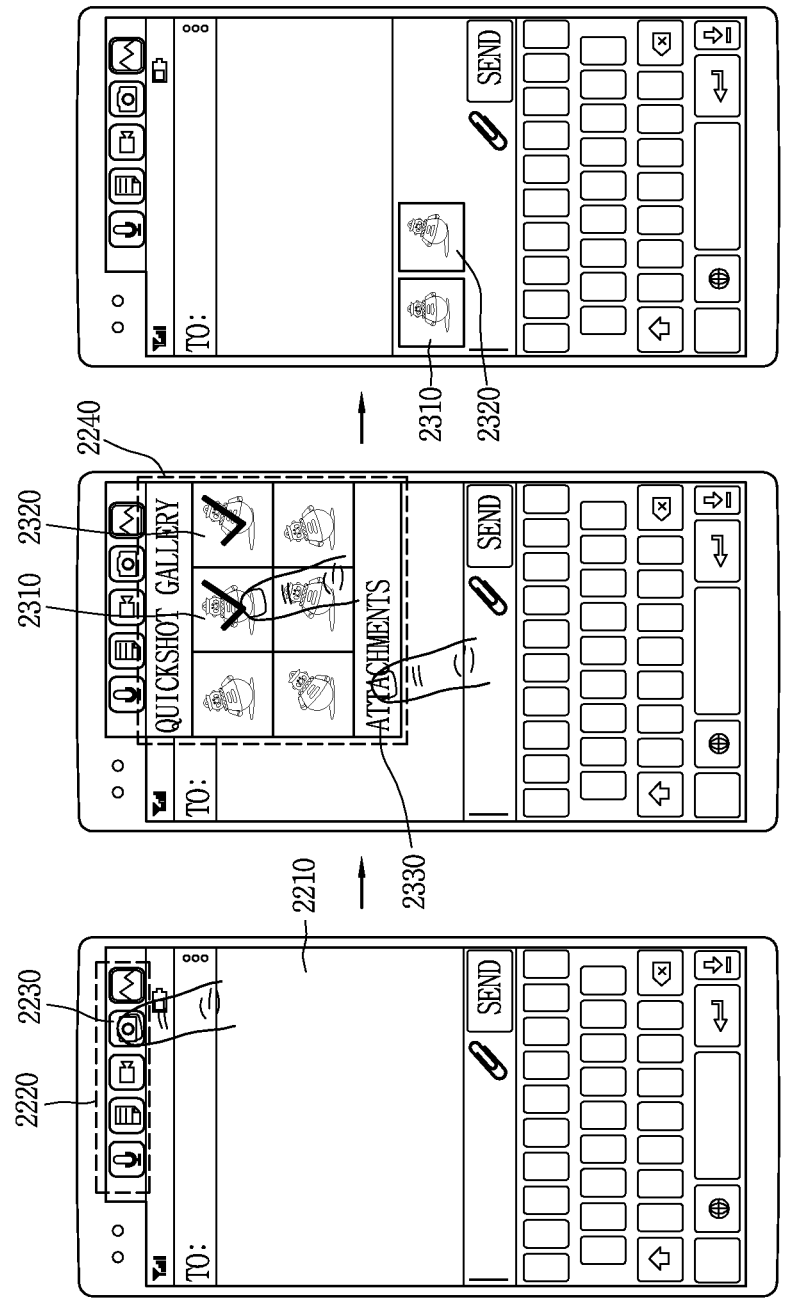
FIG. 23 is a conceptual view for explaining an embodiment of adding a plurality of images selected subsequent to consecutive captures.

FIG. 23 is a conceptual view for explaining an embodiment of adding a plurality of images selected subsequent to consecutive captures.

Referring to FIG. 23, when the execution screen 2210 of the messenger application is displayed in the main region 201, the icons 2220 of applications including attachable contents in the messenger application may be displayed in the extended region 202.

For an embodiment, an input for pressing the icon 2230 of the camera application among the icons 2220 may be applied, and then an input for touching for a predetermined period of time may be applied. As a result, photos may be consecutively captured while applying the touch input.

Specifically, a consecutive capture may be carried out while pressing a long press input. Accordingly, a gallery 2240 for showing consecutively captured images may be automatically generated and listed up in real time. The gallery 2240 may be displayed on a floating window in an instant popup form.

Subsequently, when a long touch input is applied to one 2310 of the consecutively captured images, it may enter a mode (multi-selection) capable of attaching a plurality of images to the messenger application. Furthermore, a touch input may be applied to another image 2320 to select it.

Here, the selected images 2310, 2320 may be displayed with an image effect of exhibiting that they have been selected, for example, a different color, a checkmark or the like. Then, a touch input may be applied to an attach icon 2330 to attach the selected images 2310, 2320 to the messenger application.

As described above, according to the embodiment of FIG. 23, the gallery 2240 for showing consecutively captured images will disappear when attached subsequent to selecting a plurality of the captured images 2310, 2320.

Figure 24:
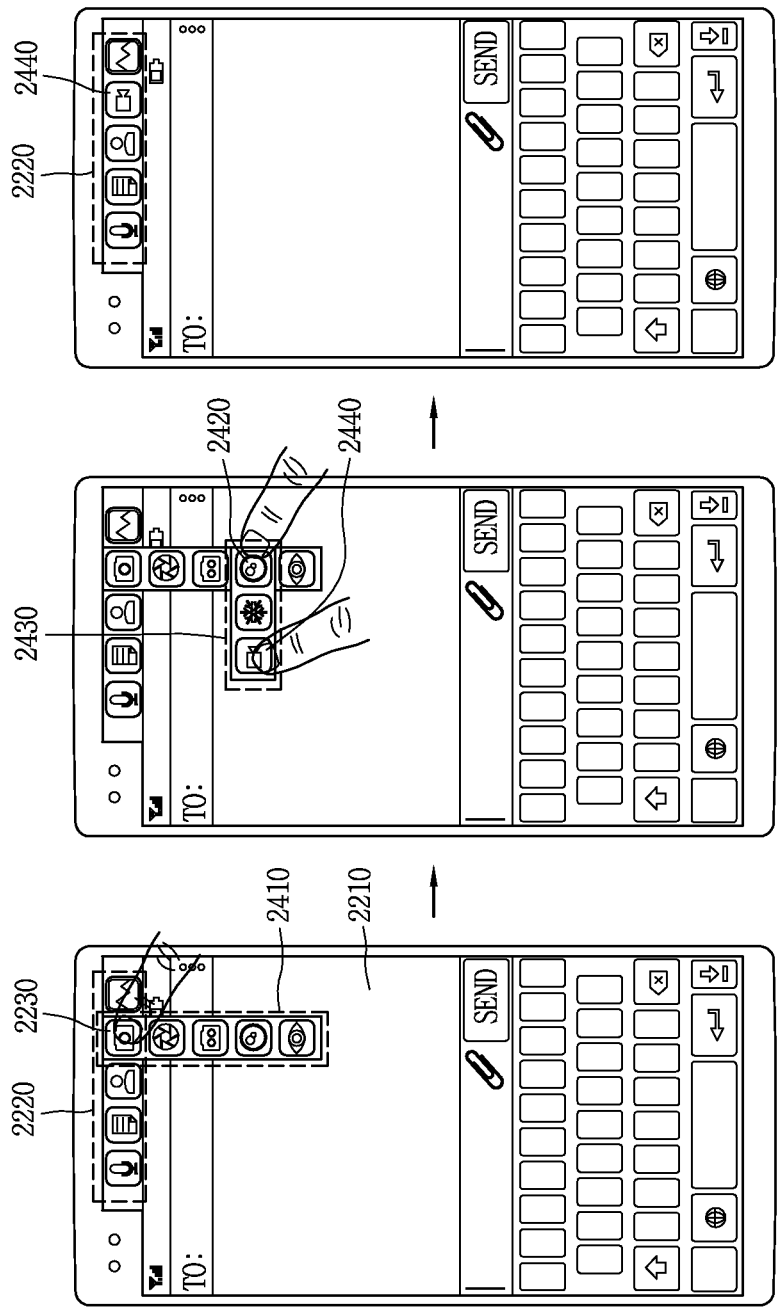
FIG. 24 is a conceptual view for explaining an embodiment of displaying icons associated with capture setting values.

FIG. 24 is a conceptual view for explaining an embodiment of displaying icons associated with capture setting values.

Referring to FIG. 24, when the execution screen 2210 of the messenger application is displayed in the main region 201, the icons 2220 of applications including attachable contents in the messenger application may be displayed in the extended region 202.

For an embodiment, in a state that a consecutive capture function is off, an input for pressing the icon 2230 of the first camera application among the icons 2220 may be applied, and then an input for touching for a predetermined period of time may be applied.

As a result, a menu window including the icons 2410 of another camera application may be displayed in the main region 201 while applying a touch input. Here, the menu window may be displayed to be linked to the first camera application icon 2230.

For another embodiment, a menu window including icons 2430, 2440 such as lens, capture technique and the like that can be used in the relevant application may be displayed while a touch input is applied to an icon 2420 of the second camera application among the icons 2410 of the camera application being displayed on the menu window. Here, the menu window may be displayed in the vicinity to be linked to the icon 2420 of the second camera application.

Subsequently, when a touch input is applied to one of icons 2430, 2440 being displayed in the menu window, the relevant icon 2440 may be displayed instead of the icon 2230 of the first camera application being displayed in the extended region 202.

Then, when a consecutive capture function is on, consecutive captures may be carried out by the selected second camera application, lens or capture technique according to the foregoing embodiment.

Figure 25:
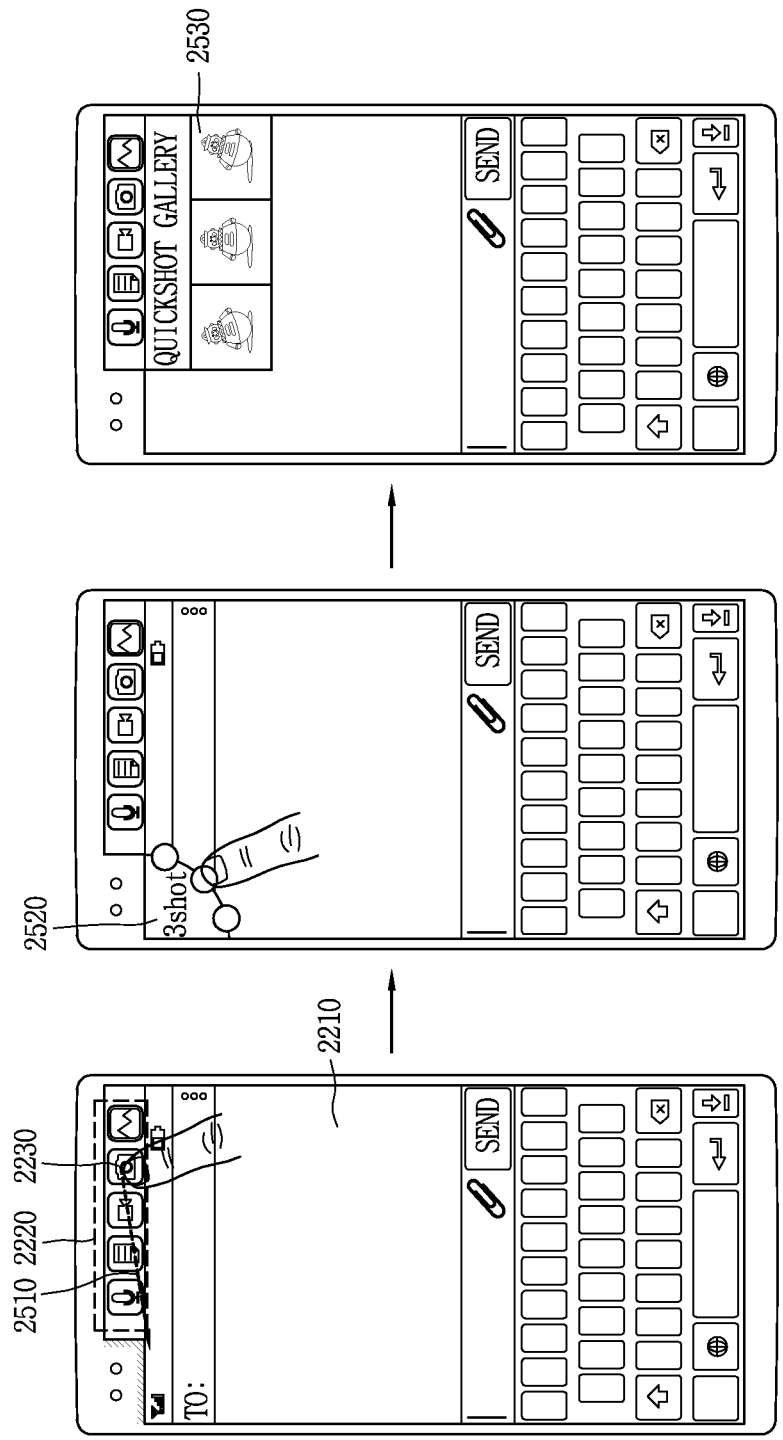
FIG. 25 is a conceptual view for explaining an embodiment of displaying icons associated with capture setting values in an edge region.

FIG. 25 is a conceptual view for explaining an embodiment of displaying icons associated with capture setting values in an edge region.

Referring to FIG. 25, when the execution screen 2210 of the messenger application is displayed in the main region 201, the icons 2220 of applications including attachable contents in the messenger application may be displayed in the extended region 202.

For an embodiment, an input 2510 for dragging to an edge region of the main region 201 may be applied to the icon 2230 of the camera application among the icons 2220.

Accordingly, a menu (hovering menu) 2520 capable of selecting a number of consecutive captures may be displayed in the edge region. When an icon for consecutively capturing three times is selected from them, an image may be consecutively captured three times. Subsequently, a gallery popup 2530 for exhibiting consecutively captured images may be displayed in the main region 201.

For another embodiment, when it is selected to capture an image once other than consecutive captures, an image may be captured and then immediately attached to the messenger application.

Figure 26:
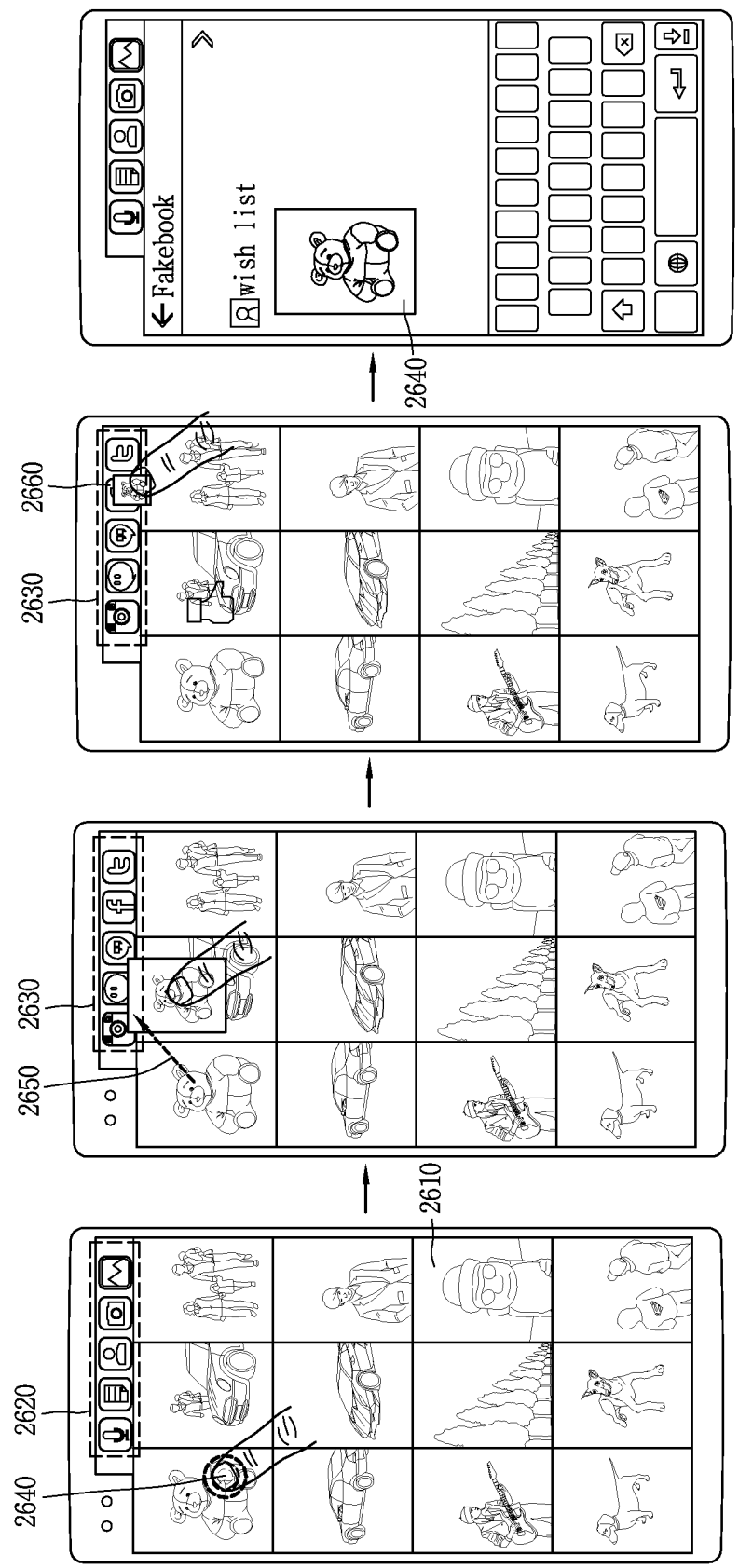
FIG. 26 is a conceptual view for explaining an embodiment of selecting an image and then executing a messenger application.

FIG. 26 is a conceptual view for explaining an embodiment of selecting an image and then executing a messenger application.

Referring to FIG. 26, an execution screen 2610 of the photo album application may be displayed in the main region 201, and the icons 2620 of preset applications may be displayed in the extended region 202.

For an embodiment, the icons of frequently used applications such as messenger, time, schedule, phone, calculator or the like may be displayed in the extended region 202.

For another embodiment, a long press input is applied to a photo 2640 being displayed in the main region 201, and then an input 2650 for dragging to a side of the extended region 202 may be applied. Accordingly, icons 2630 such as messenger, memo, message application or the like to which a photo is attachable may be displayed in the extended region 202.

Here, when a dragged photo 2640 is brought into an icon 2660 of the messenger application, the messenger application may be carried out to attach the photo 2640.

The effects of a mobile terminal according to the present disclosure and a control method thereof will be described as follows.

According to at least one of the embodiments of the present disclosure, the present disclosure may include an extended region extended from a main region in a different shape from the main region, thereby having an advantage capable of extending the display region of information.

According to at least one of the embodiments of the present disclosure, e the main region and the extended region may be used, thereby having an advantage capable of easily and quickly executing file attachment, transmission or the like.

According to at least one of the embodiments of the present disclosure, a related command icon may be displayed in the extended region during the execution of a specific application in the main region, thereby having an advantage capable of reducing a procedure or consumption time of executing a control command or the like.

According to at least one of the embodiments of the present disclosure, it may be possible to immediately attach to an application subsequent to camera capture, thereby having an advantage capable of executing consecutive captures and attachments while maintaining the setting values of the camera.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal comprising:
   a display; and
   a controller configured to:
   cause the display to display a first execution screen of a first application and a second execution screen of a second application in a first region of the display;
   cause the display to display application icons in a second region of the display, wherein the second region extends from the first region at one side of the display, and wherein applications corresponding to the application icons are associated with the first application;

cause the display to display a first menu window including a first set of icons of another camera application while applying a first touch input to a first icon among application icons in the second region, wherein the first icon corresponds to an icon of a first camera application;

cause the display to display a second menu window including a second set of icons related to a lens or capture technique while applying a second touch input to an icon of a second camera application among the first set of icons in the first menu window;

cause the display to display a selected icon instead of the icon of the first camera application in the second region based on selecting the selected icon with a third touch input to a specific icon among the second set of icons in the second menu window, wherein the selected icon is related to a lens or capture technique; and cause consecutive captures to be carried out by the second camera application in response to a selection of the displayed selected icon related to the lens or capture technique in the second region.

2. The mobile terminal of claim 1, wherein the first touch input to the first icon corresponds to a touch input to the first icon for a predetermined period of time.

3. The mobile terminal of claim 1, wherein the controller is further configured to cause the display to display one or more content items in the second region that are attachable to the first execution screen.

4. The mobile terminal of claim 1, wherein a second icon among application icons in the second region corresponds to an internet browser application and the controller is further configured to cause the display to display an internet browser application execution screen corresponding to the second icon in response to a selection of the second icon and attach a first content item from the internet browser application to the first execution screen in response to a content attachment input to the internet browser application execution screen selecting the first content item.

5. The mobile terminal of claim 4, wherein the content attachment input comprises a touch and drag input, wherein a touch to the first content item is maintained for at least a threshold length of time and then dragged to the displayed first execution screen.

6. The mobile terminal of claim 4, wherein the content attachment input comprises a pressurized touch input, wherein a touch to the first content item with a threshold level of pressure to a touchscreen is maintained for at least a threshold length of time and then dragged to the displayed first execution screen.

7. The mobile terminal of claim 1, wherein the controller is further configured to change display position of the first execution screen and an alignment direction of at least one control icon in response to a preset user input.

8. A control method of a mobile terminal, the method comprising:

displaying a first execution screen of a first application and a second execution screen of a second application in a first region of a display of the mobile terminal;

displaying application icons in a second region of the display, wherein the second region extends from the first region at one side of the display and applications corresponding to the application icons are associated with the first application;

displaying a first menu window including a first set of icons of another camera application when a first touch input is applied to a first icon among application icons in the second region, wherein the first icon is an icon of a first camera application;

displaying a second menu window including a second set of icons related to a lens or capture technique when a second touch input is applied to an icon of a second camera application among the first set of icons in the first menu window;

display a selected icon instead of the icon of the first camera application in the second region based on selecting the selected icon with a third touch input to a specific icon among the second set of icons in the second menu window, wherein the selected icon is related to a lens or capture technique; and causing consecutive captures to be carried out by the second camera application in response to a selection of the displayed selected icon related to the lens or capture technique in the second region.

9. The method of claim 8, wherein the first touch input to the first icon corresponds to a touch input to the first icon for a predetermined period of time.

* * * * *